United States Patent [19]

Bell

[11] Patent Number: 5,199,090
[45] Date of Patent: Mar. 30, 1993

[54] FLYING MAGNETOOPTICAL READ/WRITE HEAD EMPLOYING AN OPTICAL INTEGRATED CIRCUIT WAVEGUIDE

[75] Inventor: Bernard W. Bell, Colorado Springs, Colo.

[73] Assignee: Hewlett-Packard Company, Palo Alto, Calif.

[21] Appl. No.: 847,553

[22] Filed: Mar. 6, 1992

[51] Int. Cl.⁵ .......................... G02B 6/00; G02B 6/36
[52] U.S. Cl. ........................................ 385/33; 360/114
[58] Field of Search .................. 385/31, 33; 360/113, 360/114, 122, 123; 428/611, 668, 680, 681, 699, 900, 928

[56] References Cited

U.S. PATENT DOCUMENTS 4,666,789  5/1987  Gueughon et al. ................. 428/611
4,777,553  10/1988  Aoi et al. ........................... 360/114

Primary Examiner—Akm E. Ullah
Attorney, Agent, or Firm—Earnest F. Oberheim

[57] ABSTRACT

A magnetooptic head is fabricated on a glass slider and flown adjacent a magnetooptic disk in a disk drive. The transducer is fabricated on an end of the glass slider. A planar or channel waveguide structure, fabricated by ion exchange in the end face of the glass slider, couples light from a light source, such as a laser diode, to the disk for reading or writing. The head employs near-field optical techniques at the operating flying height, eliminating the need for a focusing servo. Near field operation also allows increased bit and track densities due to reduced spot size and direct overwrite using Magnetic Field Modulation on current generations (simple) magnetooptic thin films.

20 Claims, 22 Drawing Sheets

FLYING MAGNETOOPTICAL READ/WRITE HEAD EMPLOYING AN OPTICAL INTEGRATED CIRCUIT WAVEGUIDE

BACKGROUND OF THE INVENTION

1. Field of the Invention

The present invention relates to the field of optical and magnetooptical information storage systems and, more particularly, to a waveguide type of integrated magnetooptical read/write head, which flies on the air bearing at a disk surface for high density recording and reading of information onto and from a storage media, as in a disk drive.

2. Description of the Related Art

Information storage systems, particularly those used with computer systems, typically store data magnetically or optically onto a storage media, a rotating magnetic or optical disk, for example. Such storage media may include an information memory media for document files, computer memories and the like, which are used for recording and retrieval only, or media which permits recording, retrieval or erasure of information. The data stored on such media, whether magnetic or optical, is contained in tracks on the media. Once formatted on a disk, such tracks are spiral or concentric about the disk center and may number in the thousands of tracks per disk side. The total number of tracks per disk surface and, hence, the storage capacity of the disk, then depends on the diameter of the disk utilized and the track and bit density. The method of recording, either magnetically or magnetooptically, determines the size of the magnetic domains being recorded. The size of the magnetic domain determines the track density and the bit density, which in turn controls the quantity of data which can be recorded in a given area.

In both magnetic recording and magnetooptical recording, a thin film magnetic layer near the surface of a disk is magnetized in one of two directions. Information is stored in the magnetic domains of this magnetic layer along tracks by reversing the orientation of the magnetization of the magnetic domains in the layer at given points along the track a the disk rotates. Recording heads on either linear or rotary actuators are used for this purpose. Recording and reading may be done using the same head or with different heads. Where recorded information (data) is to be changed from time to time, read/write heads are employed.

In magnetooptical recording, the magnetic media is heated by a light spot to a temperature such that perpendicular magnetic recording is easily accomplished at those heated spots. Information is encoded and is stored in a sequence of magnetic domains along a track in the magnetic layer. The domain magnetization is oriented substantially normal to the surface of the disk or storage media surface, in either of two possible orientations, north pole up or north pole down, for example, depending upon the direction of the applied magnetic field.

In a prior art optical and magnetooptical media reading apparatus, such as seen in FIG. 1, an optical head assembly, controlled and supported adjacent the media surface by an actuator, is positioned and focused on a track so that reading may take place. In the reading mode, the optical head assembly focuses a light beam on a domain on the data storage media in a nominally track centered position. Typically the light beam is a laser beam which is generated by a semi-conductor laser. The Kerr rotation of the plane of polarization of the light beam reflected from that spot, indicates the magnetization of the magnetic domain at that location on the disk. The reflected light beam with polarization rotated is then coupled or projected onto a photodetector, producing a signal indicative of the state of magnetization. This signal is then processed with other such signals in succession to extract the recorded information.

In FIG. 1, a differential type of magnetooptical information reading system is employed. To this end a light beam 1 emitted by a semi-conductor laser 2 which is linearly polarized in the plane of the paper, for example, is then collimated by a collimating lens 4. The linearly polarized, collimated light beam 1 passes through a beam splitter 6. The light beam 1 is then focused as a spot on a magnetooptical recording media 8 by an objective lens 10. A magnetic domain 12 at that spot on the media which reflects the light beam 1, interacts with the light beam to rotate the plane of polarization expressed as $+$ or $-\theta K$, as determined by the magnetization of the magnetic domain 12 in the magnetic layer.

The polarization rotated, reflected light beam is nominally collimated by the objective lens 10 and is reflected by the beam splitter 6, whereafter it is optically focused as a converging light beam 1a by a lens 16. The converging beam 1a is divided by a polarizing beam splitter 18 with the divided, separate light beams 1b and 1c then passing through a pair of analyzers 20, 22, respectively, to be detected as intensity modulated light beams 1d, 1e, by a pair of photodetectors 24, 26, respectively.

Efforts to reduce the size and weight of optical heads are represented by optical integrated circuits or thin film structures, one type of which is found in FIG. 1 of U.S. Pat. No. 4,911,512 which is represented in FIG. 2 herein. In FIG. 2, there is shown a far-field type of optical transducer 30. A semi-conductor laser 32 is secured on a submount 33 of silicon, for example. A thin film silicon dioxide, $SiO_2$, waveguide element 34 and a glass waveguide layer 36 are also fixed on the submount 33. On the glass waveguide layer 36, there are formed a collimator lens 36, a beam splitter 38 and a focusing grating coupler 40. A light beam 1 emitted by the laser 32 enters the waveguide layer 36 at one of the end faces thereof. The light beam 1 is collimated by the lens 36 and concentrated or focused by the focusing grating coupler 40, at a point 42, projected as a spot on a disk surface (not shown). Light reflected from the spot on the disk returns through the focusing grating coupler 40 into the waveguide 36 and is directed by the beam splitter 38 to an optical sensor 44 located on one side of the waveguide 36 so that information recorded on the disk is read.

As seen in FIG. 3 herein, which is a representation of FIG. 5 in European patent application, publication number 0 338 864 A2, published Oct. 25, 89, effort has been directed towards providing a thin film magnetooptic head 50 which is mounted on a slider 52, to provide near-field optical coupling with a recording medium 54. The slider 52, as described in this patent application, flies on an air bearing, i.e., the air which moves with the media surface as the media 54 moves or, if a disk, rotates. A light beam generated by a light source 56 is guided through an optical waveguide 58 to the recording medium 54, where it is reflected back through the waveguide 58, to a point at a waveguide intersection, or overlap, 60 where a portion of the reflected light is projected through a second optical waveguide 62 which is optically coupled to a photodetector 64 provided at the end of the second optical waveguide 62. By providing a polarizer 66 on the first optical waveguide 58 and an analyzer 68 on the second optical waveguide 62, the rotation of the polarization of the light beam can be sensed, from which the information, recorded in the form of magnetic domains (not shown) in the magnetic medium 54, can be determined.

As described in the referenced patent application and as seen in FIGS. 7, 18 and 19 therein, this thin film magnetic head 50 includes a magnetic recording section. This magnetic recording section, comprises an electromagnet which has a thin film magnetic circuit defining an air gap adjacent to and paralleling the media surface. A thin film coil links this magnetic circuit. The magnetic circuit defines an air gap adjacent to the media surface for recording magnetic domains poled in the magnetic layer in a plane paralleling the media surface. Magnetic recording, as discussed in this patent application, is the same as that ordinarily performed by an induction head, which from the description in this patent application, involves no use of the optical system for heating of the magnetic media at the time of recording or at the location where recording is taking place. This coupled with a magnetic circuit arrangement which poles the magnetic domains in a plane paralleling the media, as seen in FIGS. 7 and 19 of that patent application negates the potential of high density recording. The description of the referenced application mentions conventional recording techniques. One convention employs a stray field for recording in a heated magnetooptic media. A second convention employs a magnetic bias field. Heating of the media is not mentioned in this second convention which appears to be the recording technique contemplated with respect to the recording heads of FIGS. 7, 18 and 19 of the referenced application.

Although vertical recording is illustrated in FIGS. 16B1 and 17B1, such recording is nowhere linked to the recording head described in the application either by direct reference or by implication.

SUMMARY OF THE INVENTION

Improvement is achieved in compactness and weight reduction of the magnetooptic head, and in increased areal and volumetric recording density as well as in direct overwrite capability according to this invention, in the provision of a thin film integrated circuit type of magnetooptic read/write head, comprising an optical waveguide on a slider in a disk drive, either integrated into or bonded onto the slider, preferably one edge or end of the slides. This slider is of conventional configuration and size, and, in one embodiment of this application, is preferably made of glass, to permit waveguide fabrication and integration by the technique of ion exchange. This slider is adapted to be flown a small distance above a moving recording media, such as a rotating disk in a magnetic disk drive. To this end, the slider is flexibly mounted on the end of a flexure assembly forming part of an actuator in a disk drive. In such a drive, the slider of the magnetooptic head may be parked in contact with the disk in a position removed from the data tracks, or may be parked on a ramp off the disk surface. When the disk spins up to its constant rotational speed, the head flies on the thin film of air, commonly called an air bearing, clinging to and moving with the disk surface in preparation for its transducing function.

A light source (adjacent to one end of the waveguide, either as a separate unit or as part of the thin film construction,) is optically coupled to the waveguide. A laser diode is usually employed as the light source. Also present on the slider, either bonded to or built onto, is an electromagnet having a magnetic circuit and a coil which links the magnetic circuit, to produce an electromagnetically generated field, usually referred to as a magnetic field, perpendicular (not parallel) to the surface of the storage medium.

Information stored in a magnetic layer on the magnetooptic media is read by this magnetooptic head as follows: Light from the laser diode is propagated in the waveguide and confined in one or two dimensions by the waveguide. In the case of a planar type of waveguide, the light confinement in the plane of the waveguide is provided by an element with optical power (a lens or mirror) to converge the sheet of light to a focused spot. The effective spot size at the media is thus governed by two separate mechanisms which in this case are: The numerical aperture of the lens and the size of the guided mode of the waveguide itself. In the case of a two dimensional waveguide, called a channel waveguide, the light is confined in both dimensions by the waveguiding effect itself, and, thus the effective spot size at the media is governed by this same effect. The light beam, after propagating through the waveguide, exits through the end of the waveguide and is incident at a spot on the media. The recording media at that spot then reflects the light back into the waveguide. The light is sampled from the waveguide and the Kerr rotation of the plane of polarization of the reflected light, occasioned by the interaction of the magnetic domain in the media at that spot with the light, is detected. From this and successive such detections, the information contained on the recording media can be obtained.

To write information, in the form of magnetic domains magnetized perpendicular to the magnetic layer on the magnetooptic storage media, such as a disk, the light source is operated at constant power to heat the magnetic layer, at which time the electrical input to the coil is modulated in accordance with data to be written. The electromagnetic field of the coil which surrounds a single pole type of magnetic circuit, whose field is coincident with the laser spot on the media, is thereby modulated with the information to be stored. This technique of magnetooptic writing is known as Magnetic Field Modulation or MFM. It has been demonstrated that very small domains are recorded in this manner by modulating the magnetic field while holding the laser power constant. The very small magnetic domains are easily read by the same magnetooptic head due to the small mode field size of the waveguide. The information, in terms of track and bit density, that can be recorded and read in this manner thus exceeds that of the "far-field" magnetooptic heads (those with spots formed by lens only read/write heads). The near-field optics of the present invention increases the bit density and track density in magnetooptic recording by producing a very small read spot which is able to resolve the small domains produced by the MFM (Magnetic Field Modulation) type of magnetooptic recording and by confining the domain widths to the very small heated spots in the magnetic layer on the media respectively.

Small spot size is achieved because the mode size of the light of a guided mode in a waveguide is governed by different physical principles than those which govern the formation of the spot formed by a focusing lens. Even though light in the guided mode must leave the waveguide to interact with the storage media and thus spreads as it propagates to the storage media, the size of the heated spot in the magnetic layer at the media in the near-field of the waveguide is smaller than that which reasonably can be formed with far-field optics using a lens.

The in-track magnetic domain size controls the number of bits per inch of information that can be stored in the media and which can be read therefrom and the cross track magnetic domain size controls track density. Magnetizing the magnetic domains perpendicular to the media surface, increases magnetic domain storage density over that achievable with parallel recording, such as that employed in the published patent application referenced hereinabove.

This reduction in the size and mass of the magnetooptic read/write head allow volumetric data storage density and access time improvements in the disk drive in which the head is employed. Higher volumetric density is possible because the smaller head allows more disk platters to be used in the given volume of space allotted for the head disk assembly in a standard form factor disk drive product. Increased data access performance is directly due to a reduction in the moving mass that must be actuated to position the head over a particular track of data. The rewrite or overwrite of data using simple magnetooptic media is made practical on double sided disks by the near field characteristic of the head which allows a small fast electromagnetic coil for MFM writing to be on the same side of the disk as the optical read/write head.

BRIEF DESCRIPTION OF THE DRAWINGS

The invention will be better understood by reference to the following specification when considered in conjunction with the accompanying drawings, in which.

DESCRIPTION OF THE PREFERRED EMBODIMENTS

Figure 1:
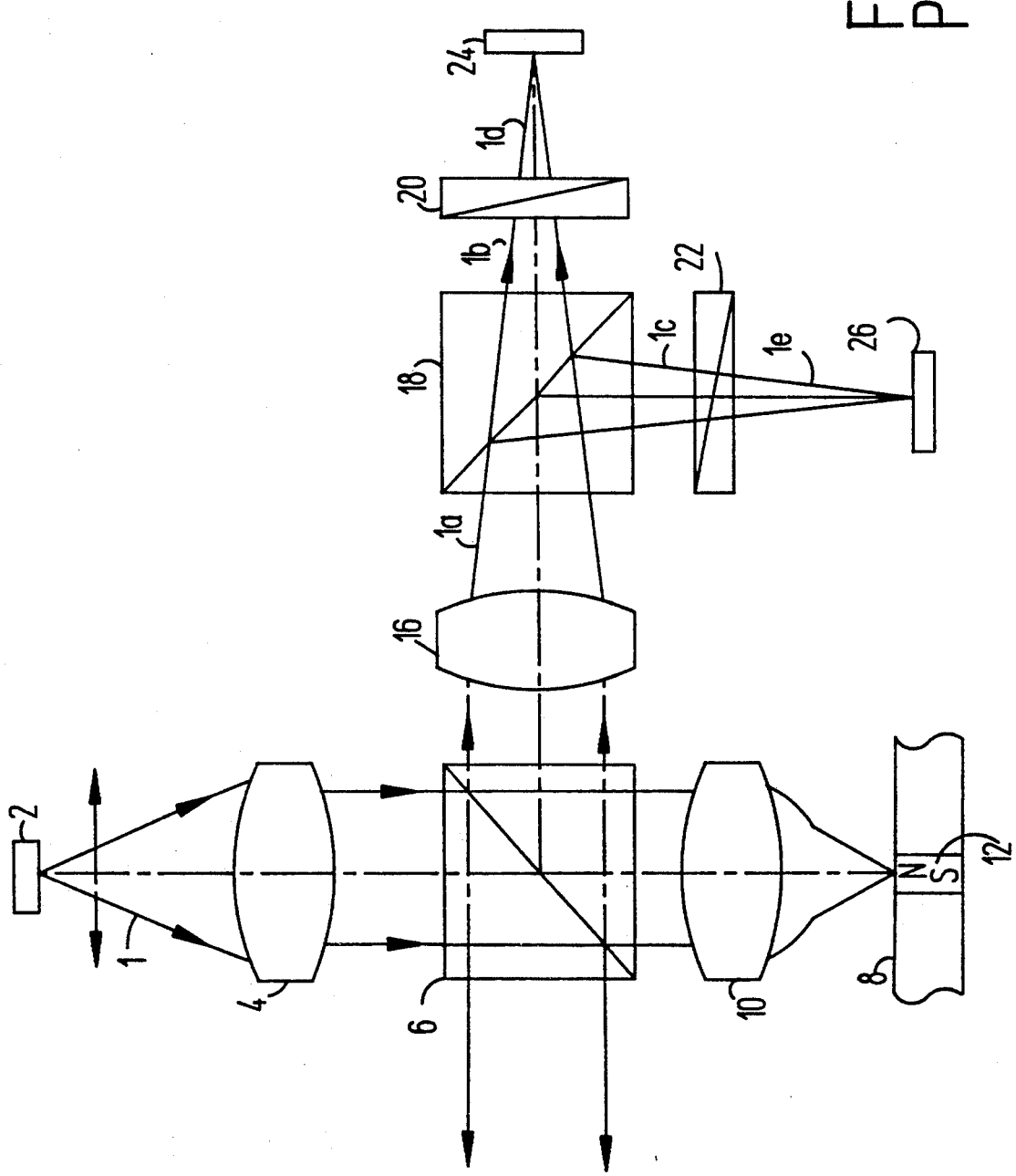
FIG. 1 is a plan view of a prior art magnetooptical information transducer.
Figure 2:
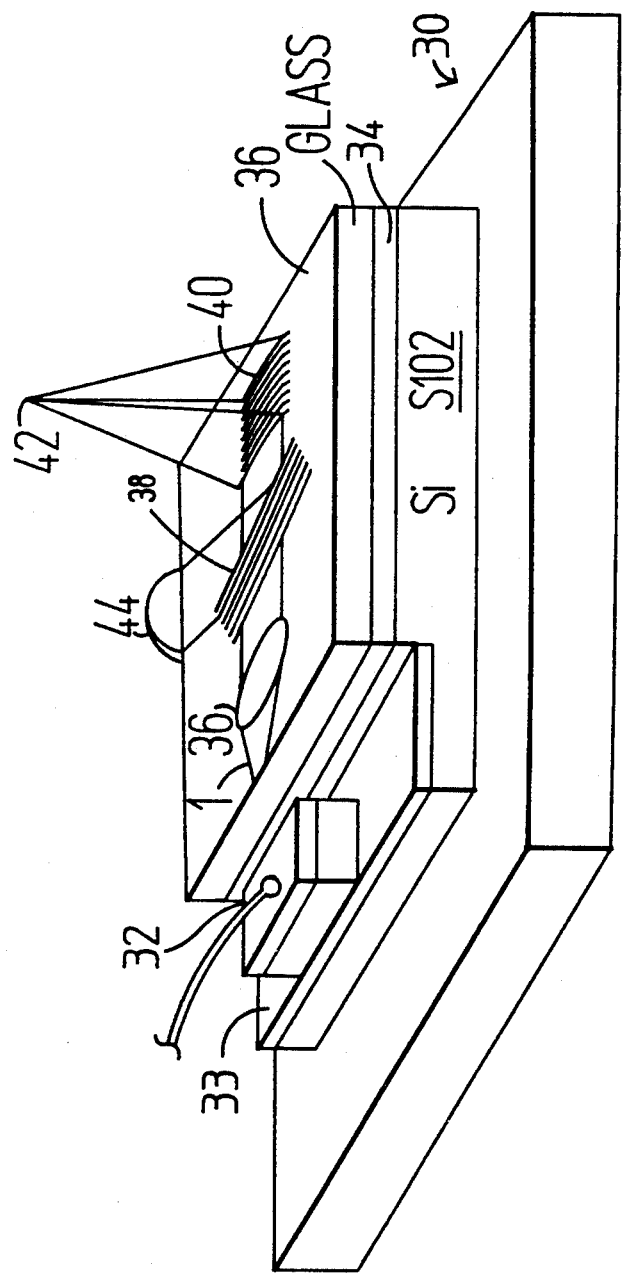
FIG. 2 is an isometric view of a prior art, integrated circuit type of optical head assembly, employing far-field optics.
Figure 3:
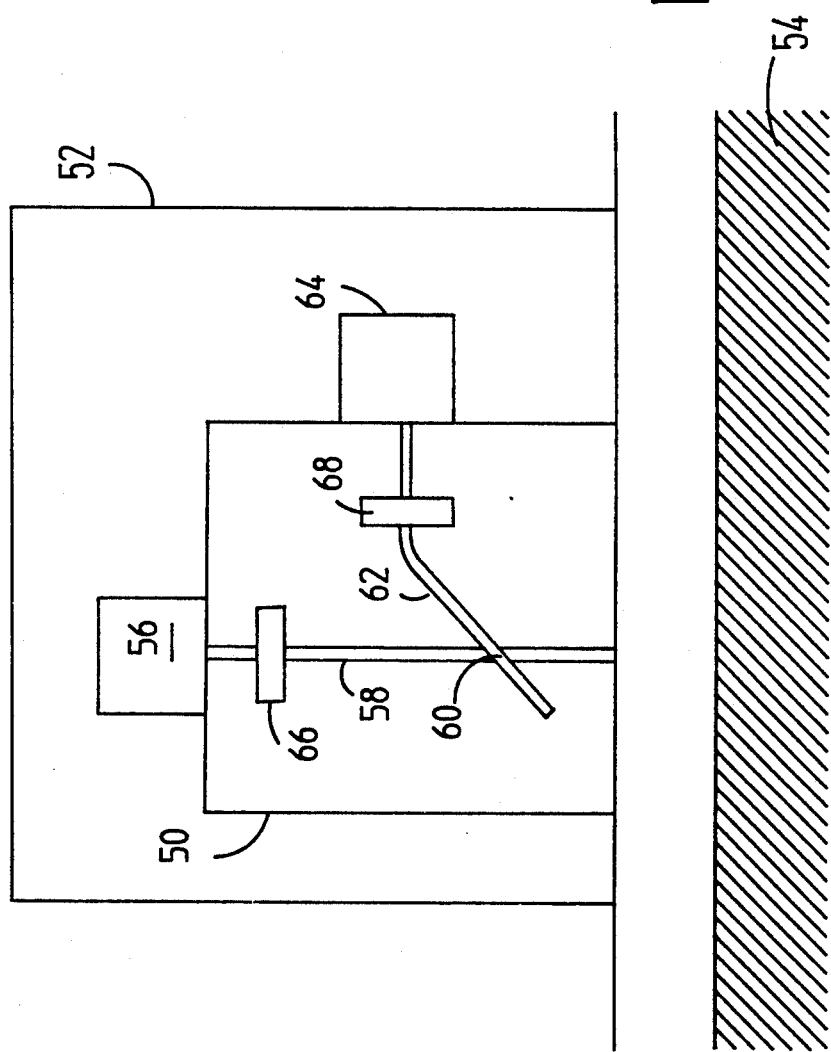
FIG. 3 is a plan view of a prior art near-field type of magnetooptical head intended to be flown on the air bearing of a moving magnetic media.
Figure 4:
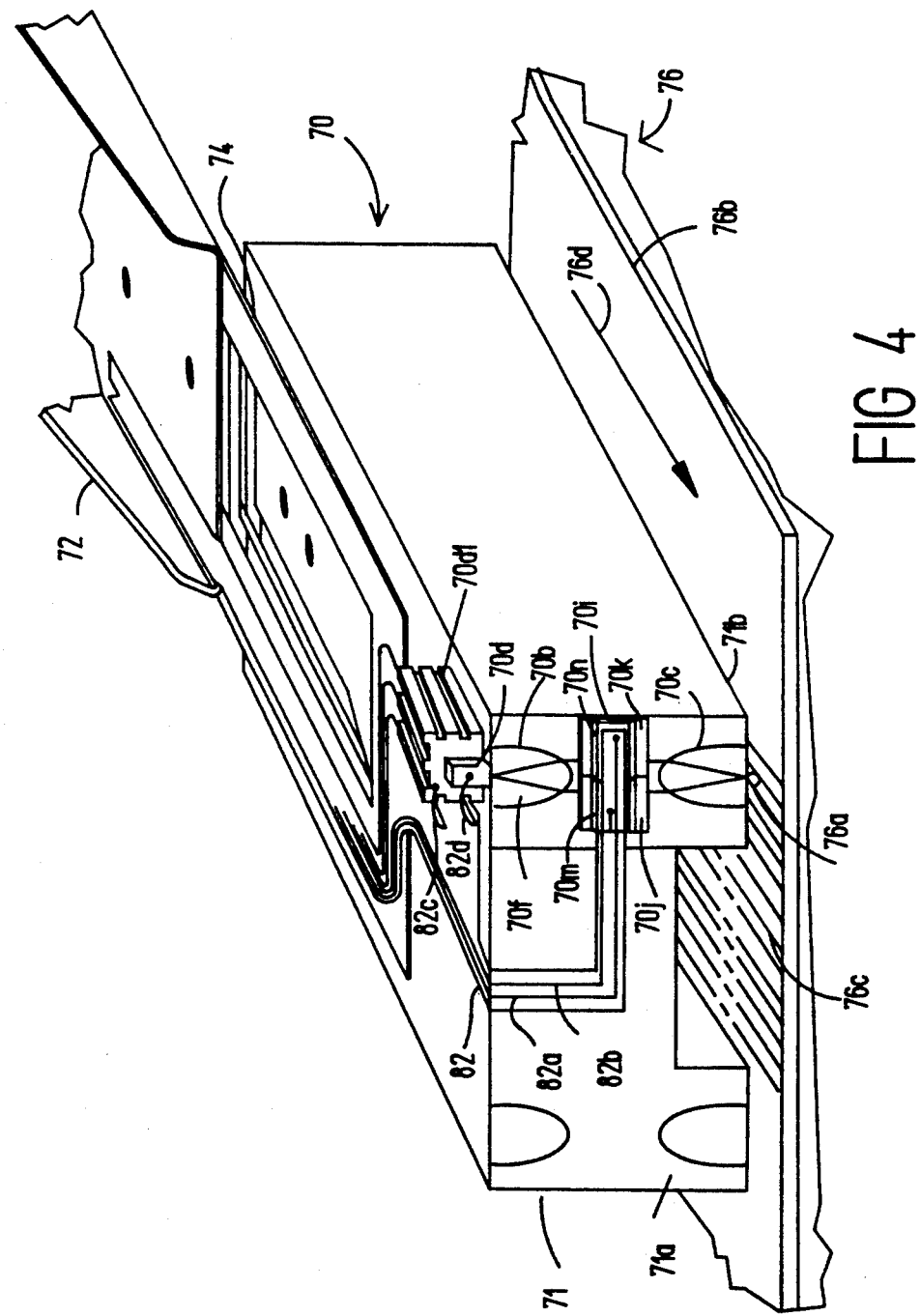
FIG. 4 is an isometric view of a planar waveguide type of magnetooptical head mounted on an aerodynamic slider, embodying the principles of this invention.

Broadly stated, the best mode for practicing this invention, which is presently known, comprises fabricating an optical integrated circuit, magnetooptic, read/write head assembly 70 on one end or one edge of a slider, such as a glass slider 71 in a disk drive. One embodiment of this invention, employing a planar waveguide, is seen in FIG. 4. Here the slider 71, while shown enlarged in FIG. 4, is of conventional size and shape. It is flexibly supported on the end of a load beam 72 by means of a flexure 74, permitting slider pitch and roll movement while providing directional rigidity. This two piece assembly is called a flexure assembly. The end of the load beam 72 opposite the slider 71 is attached to an actuator structure (not shown) and is usually part of an armstack structure comprising two or more flexure assemblies, depending upon the number of disks in the disk drive. The actuator structures are servo driven and are either of the linear or rotary type. These actuators position the magnetooptic heads on the sliders, to read or to write in spiral or concentric circumferential tracks, at selected radial positions at tracks recorded in the surface of a disk 76 in a disk drive, while flying on the thin film of air, the air bearing, which clings to and moves with the surface of the disk as the disk rotates. In this position, the magnetooptic head 70 is selectively used to read or to write data, in the form of magnetic domains 76a, in a magnetic layer 76b on the disk 76. The disks are conventional, as is the actuator structure and the means for positioning the actuator structure. The disk substrate, for example, may be metallic (aluminum) or non-metallic (glass) and is provided with the magnetic layer 76b in which the magnetic domains 76a are recorded. The disk surfaces are protected with a thin wear protective layer (not shown).

The slider 71 comprises slider rails 71a and 71b along its bottom side edges. When the slider is in parked position, either these rails may rest upon the surface of the disk in a position beyond the data tracks, or by off loading the slider onto a ramped structure, these rails are lifted free of the disk surface. As the disk spins up to its constant rotational speed, the slider either takes off and flies when the disk drive is being put into operation, or it is ramped onto the air bearing surface after disk spin-up. The slider rails 71a, 71b, substantially parallel the tracks 76c in the magnetooptic media 76. The direction of movement of the media with respect to the slider in a disk drive, this being the direction of rotation, is indicated by an arrow 76d on the surface of the media 76. Thus the near end of the slider 71, as viewed in the drawing, is actually the trailing edge of the slider in operation.

Figure 5:
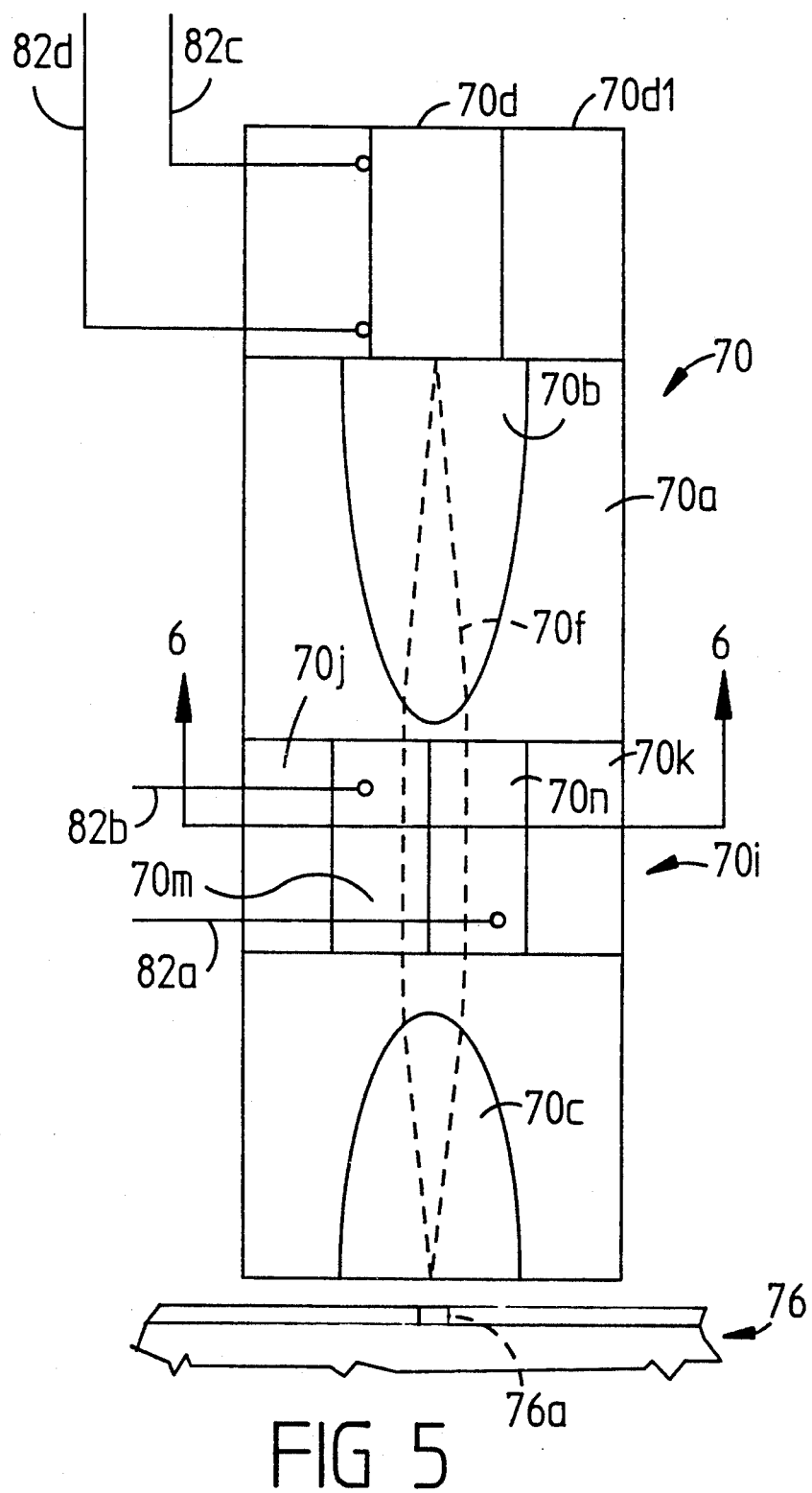
FIG. 5 is an enlarged plan view of the planar waveguide of the magnetooptic head of FIG. 4.

Now referring to FIGS. 4 and 5, which omit the electromagnetic coil structure for simplicity, the optical integrated circuit type of magnetooptic transducer head 70 comprises a waveguide 70a, preferably formed by ion exchange as an integrated part of the glass slider 71. This planar waveguide 70a is disposed in the right hand side of the end face of the slider 71 as viewed in FIG. 4, and extends between the bottom end of the slider rail 71b and the upper surface of the slider. Conventional ion exchange techniques are used in fabricating this waveguide, for example, Ag+, k+ or Th+. An exaggerated indication of the depth or thickness of this integrated planar waveguide in the glass slider, is indicated by the dotted line paralleling the waveguide edge. This depth is greatly exaggerated in the illustration and in practice involves just a few microns of thickness. A collimator lens 70b is formed by masking and ion exchange in the upper end of the waveguide 70a and an objective lens 70c is similarly formed in the waveguide structure by ion exchange at the bottom end of the waveguide 70a. A laser diode type of laser 70d is optically coupled to the collimator lens 70b at the upper edge of the waveguide 70a. The laser 70d is supported in this position by a heat sink 70d1 which is bonded to the upper surface of the glass slider 71, the laser 70d being bonded to the end face of the heat sink 70d1 in the position indicated. Thus heat which is generated during operation of the laser 70d is absorbed in the heat sink 70d1 and dissipated in the ambient air. The laser 70d produces a laser beam 70f, see also FIG. 5, which is collimated as indicated by the collimator lens 70b, propagated through the planar waveguide 70a and focused by the objective lens 70c onto the magnetooptic media 76 at the location of the magnetic domain 76a. A slight modification would include a short section of channel waveguide at either (or both) the laser or the media ends to allow greater tolerances in the position of the ends.

A photodetector assembly 70i is mounted upon the outer surface of the waveguide 70a in a position between the collimator lens 70b and the objective lens 70c, to be optically coupled to the laser beam 70f. A specific polarizer/detector assembly 70i for this application is a calcite micro-prism photodiode, which, as seen, comprises two prisms, 70j, 70k, and two photodiode sections 70m and 70n. A flexible circuit, generally designated 82, contains conductors 82a and 82b which are connected to the respective photodiode sections 70m and 70n as well as the necessary basis and ground leads for example. Conductors 82c and 82d provide electrical power connections for the laser 70d.

Light from the laser diode type of laser, 70d, collimated by the lens 70b, propagates through the planar waveguide 70a toward the magnetooptic media 76. The light in the planar waveguide is confined in one of two dimensions by the thickness of the waveguide. The light propagates along the waveguide 70a and exits through a polished or cleaved waveguide end adjacent the media. In passing through the objective lens 70c, the light beam is focused in the plane of the waveguide on the end of the magnetic domain 76a.

The dimension of the light spot along the track (in-track) at the surface of the disk is controlled by the thickness of the waveguide and the refractive indices of the waveguide. This is somewhat analogous to the magnetic gap in a magnetic head. The cross track spot size is governed by the focused spot formed by the objective lens 70c at the bottom end of the waveguide 70a. This is somewhat analogous to the pole width in a magnetic head, but much smaller.

This invention permits recording about 65 kilobits (magnetic domains) per inch using an Ag+ion exchange glass waveguide system. The theoretical maximum for this approach is approximately 140 kilobits per inch using gallium aluminum arsenide (GaAlAs) materials.

The bits (domains) per inch provided by this invention are of the order of about $1.5 \times -3 \times$ those which are possible using free space or far-field optics. This is due to the near-field nature and the waveguide structures of this invention, which provide a smaller in-track domain size than free space optics, since the waveguide mode field size is not limited by Fraunhofer (far-field) diffraction.

Figure 6:
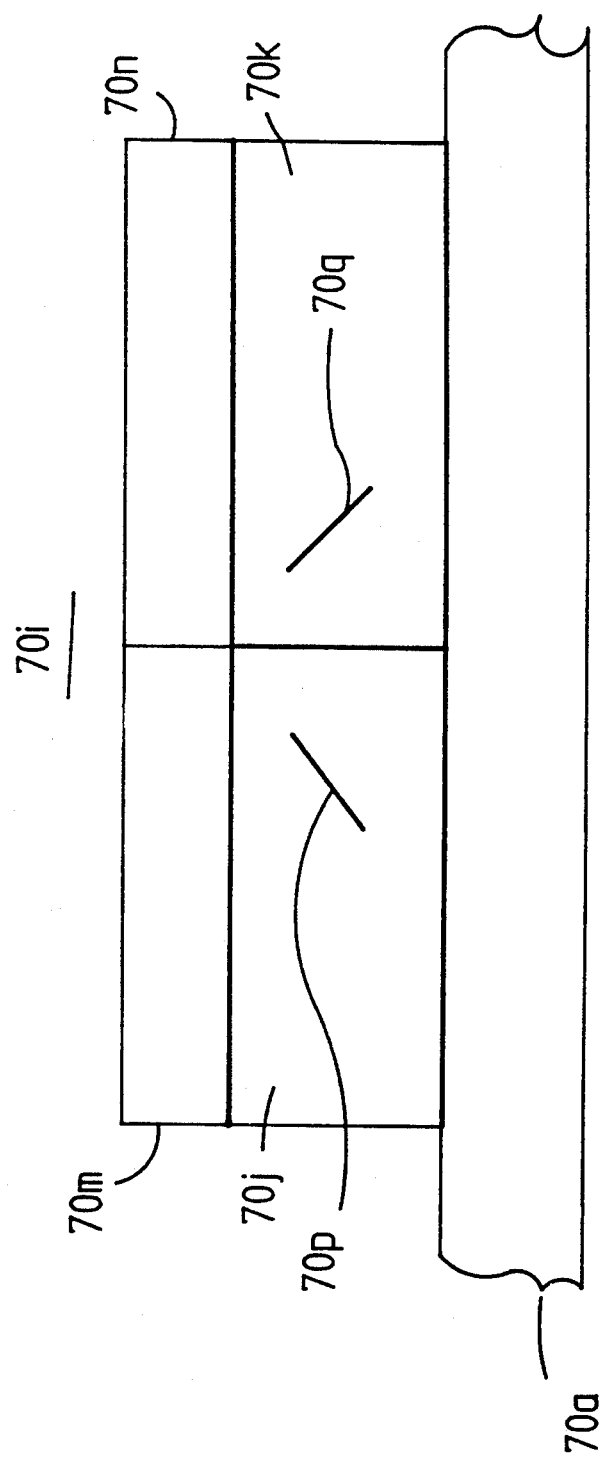
FIG. 6 is an enlarged sectional view of the polarizer/analyzer detector of FIGS. 4 and 5, taken on the line 6—6 of FIG. 5.

FIG. 6 is an enlarged cross-sectional view of the polarizer/detector assembly 70i seen in FIG. 4. In this figure, and in FIG. 7, the slider 71 is not shown. The calcite prisms, 70j and 70k are positioned on the waveguide 70a. The crystal orientation of each of the calcite prisms is illustrated at 70p and 70q. The angular orientation of the optic axes of the crystals is reversed, that is, opposite in rotational sense from one another. Typical refractive indices are:

Calcite: no=1.6477; ne=1.4817; $\lambda$=0.83.

Glass Waveguide: ng=1.51−1.61

Light of each polarization sees a different cover index. Light polarized perpendicular to the direction of the optic axis of a calcite prism experiences the ordinary index of refraction, no, of the prism and is not guided and light of this polarization escapes. This polarized light escapes via the calcite prisms 70j and 70k and impinges upon the respective photodetectors 70m and 70n, which each produce electrical signals.

Figure 7:
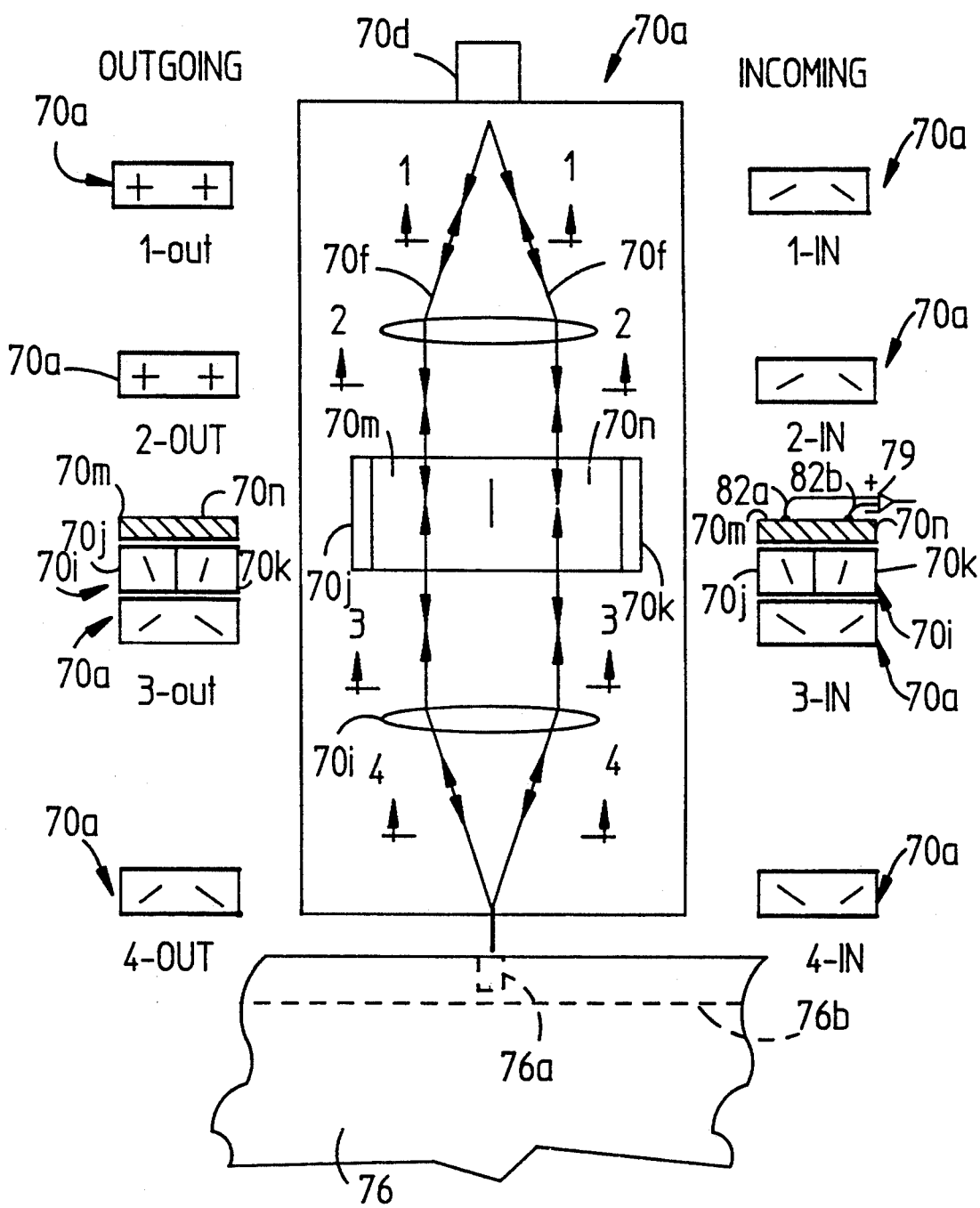
FIG. 7 illustrates the polarization states of the light beam at different locations in the waveguide of FIG. 4.

FIG. 7 is a schematic representation of the magnetooptical planar waveguide 70a illustrated in FIG. 4, and serves as a basis for explanation of its operation. The slider 70 is not shown. In this figure, the essential components of the planar waveguide type of magnetooptic head 70 are schematically represented. The planar waveguide 70a is depicted in a position above and spaced from the magnetooptical media 76. The laser 70d projects the laser beam 70f into the planar waveguide 70a where it is collimated by the collimating lens 70b. It is focused by the objective or focusing lens 70c onto the media 76, for example, at the location of a perpendicularly polarized magnetic domain 76a. The laser beam transmitted from the waveguide is herein referred to as the outgoing laser beam. The laser beam which is reflected at the surface of the media 76 back into the waveguide is referred to as the incoming laser beam. The direction of propagation of each of the outgoing and incoming laser beams is represented by the arrows which are pointed downwardly and upwardly on the marginal rays of the laser beam 70f. The incoming laser beam is detected by the polarization/detector assembly 70i to produce an output signal, via a comparator 79, which is representative of data recorded in the form of magnetic domains 76a in the magnetic layer 76b of the media.

On the left side of the waveguide 70 are individual reduced cross-sectional views, 1-out through 4-out, of the waveguide 70 taken at the various locations indicated by the correspondingly numbered cross-section lines. These views individually depict the dominant polarization state of each of the two halves of transmitted or outgoing laser beam 70f, at these individual locations. Thus the cross-sectional views marked (1-out) and (2-out), for example, depict the polarization states of the laser beam in its outgoing mode, prior to the polarization/detector assembly 70i. Propagation of the laser beam past the detector assembly 70i, results in the polarization states (3-out) and (4-out) of the outgoing laser beam, in which the polarization states are rotated in opposite angular orientations. The outgoing laser beam, in these polarization states, is focused, transmitted and projected upon the surface of the media 76.

Assuming at this point that the focused laser beam is incident upon a magnetic domain 76a, the plane of polarization of the laser beam is rotated. The polarization states of the reflected laser beam as it enters the waveguide 70 as the incoming laser beam, is represented in the cross-sectional view of the waveguide 70, denoted (4-in), appearing at the bottom right side of the waveguide 70. The incoming laser beam is collimated by the lens 70c which now functions as a collimating lens for the incoming light. The incoming laser beam is shown linearly polarized in the general direction of the normal to the optic axes of the calcite prisms 70j and 70k, respectively, and the incoming laser beam in these polarization states escapes the waveguide 70a, via the calcite prisms, 70j, 70k and impinges upon the respective photodiodes 70m and 70n. The electrical outputs thus produced are differentially compared in a comparator 79. The comparator output signal provides an indication of the state of magnetization of the media at the magnetic domain location 6a, either up or down, since more or less light impinges on the respective photodiodes 70m and 70n depending the sense of the media induced polarization rotation. Assuming that such discrete recordings represent data, then the successive electrical outputs of the comparator 79, as the head scans the track, each represent discrete bits of data which may be decoded by any conventional means. The cross-sectional representations of the waveguide 70a which are denoted (2-in) and (1-in), indicate the polarization states of the incoming laser beam after it has passed the detector assembly 70i.

Thus, magnetooptic detection, with the planar waveguide, magnetooptic transducer of FIG. 4, is accomplished by the simple expedient of disposing the two calcite prisms, 70j and 70k, in side-by-side positions on the planar waveguide 70a, along the path of the laser beam 70f, with their optic axes oppositely angular positioned $(+/-\theta)$ in substantial correspondence with the planes of polarization of light reflected from the media, i.e., the incoming laser beam. With this angular orientation of their optic axes, the calcite prisms 70j and 70k form an anti-guide for polarization states at $+/-(90-\theta)$ of the incoming laser beam, as illustrated and described in connection with FIG. 7.

In the interest of minimizing drawing complexity in explaining the structure and function of this magnetooptic, planar waveguide type of transducer, a facility, in FIGS. 4–7 for recording magnetic domains associated with a waveplate structure, has not been illustrated. Having laid the ground work in FIGS. 4–7 for discussions of the waveguide structure and function, the illustration and description of the electromagnetic structure for magnetic domain recording will be taken up in connection with FIG. 8 and others which follow.

Figure 8:
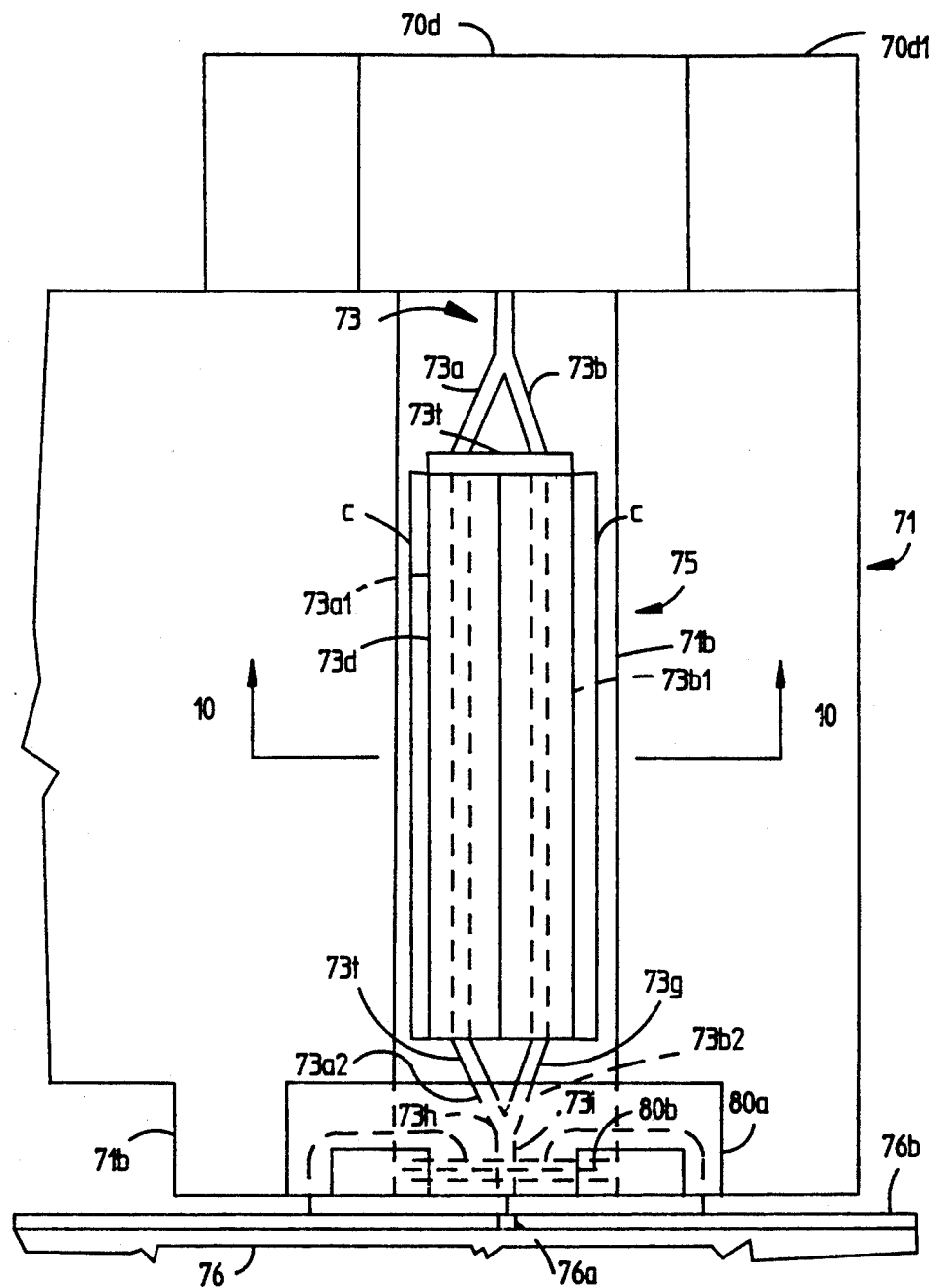
FIG. 8 is a plan view of a channel waveguide type of magnetooptic head, embodying the principles of this invention.
Figure 8A:
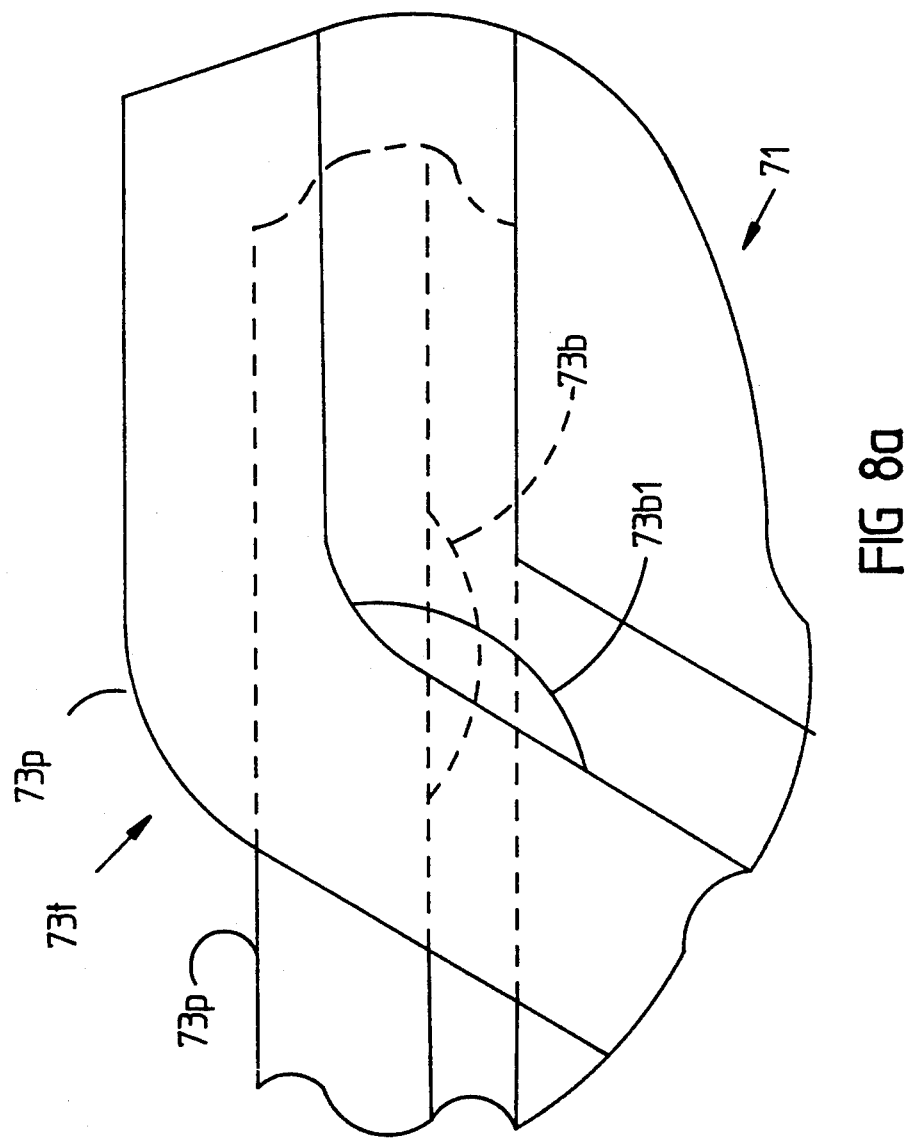
FIG. 8a is a sectional view showing the angular relationship of sections of a channel waveguide branch.
Figure 9:
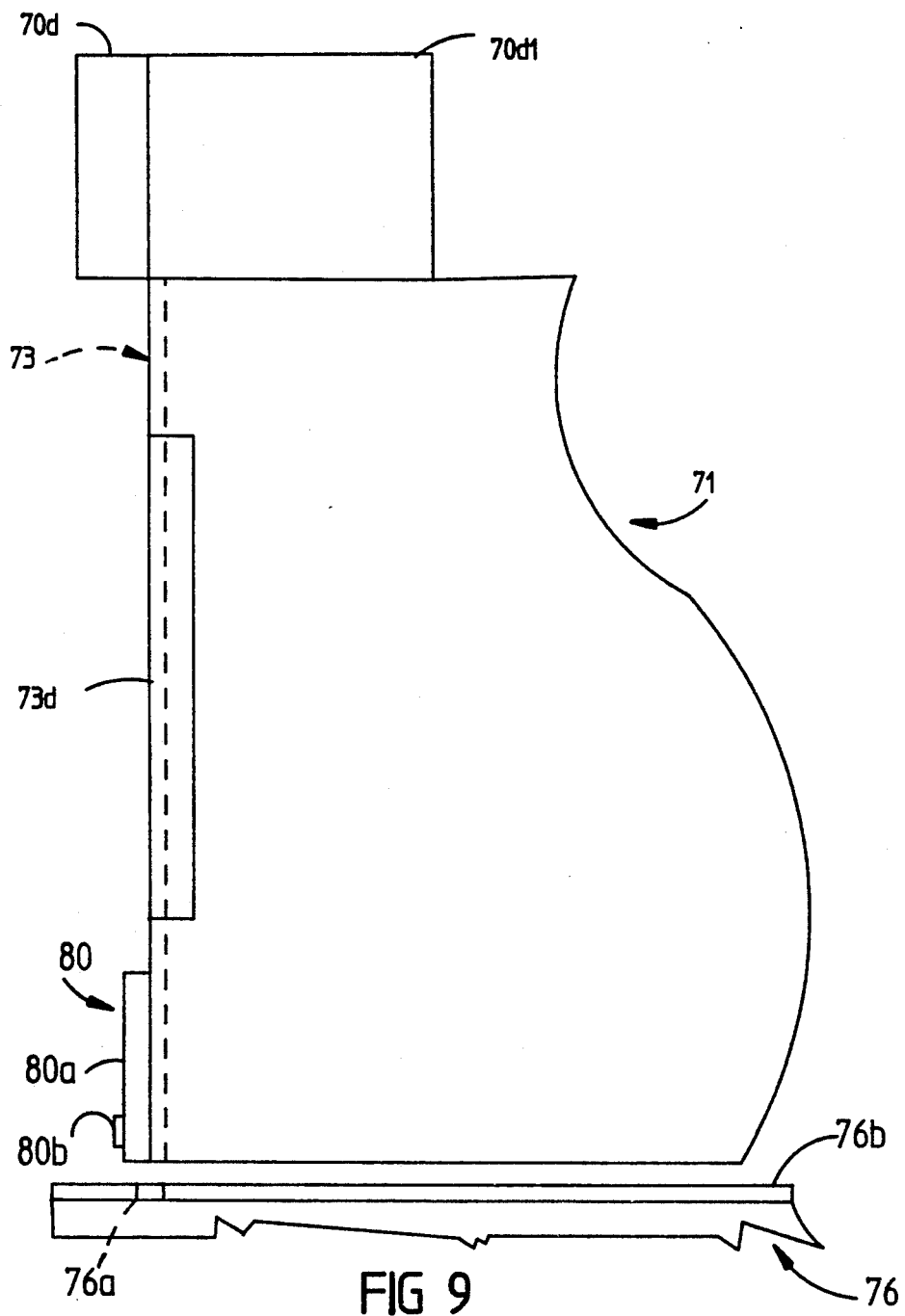
FIG. 9 is a side view of the magnetooptic head of FIG. 8.
Figure 10:
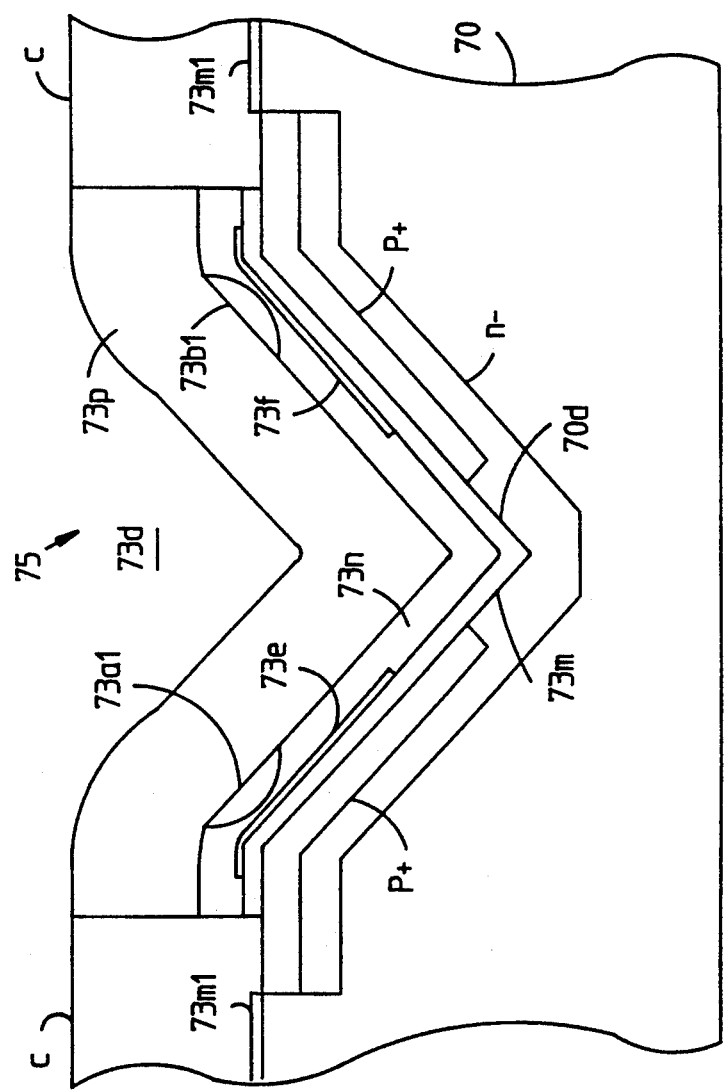
FIG. 10 is a cross-sectional view, taken on the line 10—10 of the polarizer detector section of the channel waveguide structure of FIG. 8.

FIGS. 8–10 illustrate another waveguide type of magnetooptic head embodying this invention. In this embodiment the light energy confinement mechanisms, in both waveguide cross-sectional dimensions, are due to the waveguiding effect. This type of a waveguide is known as a channel waveguide. Light from the laser diode type of light source 70d is coupled into a single channel waveguide section 73 of a channel waveguide structure 75 and propagates toward the recording media 76. This light has a polarization component in the TE mode of the waveguide section 73. This channel waveguide structure 75 comprises waveguide branches 73a and 73b. A junction 73c at which the branches are formed, functions as a power splitter or power divider. At the junction 73c, the light beam is divided in two parts, each part propagating in its respective waveguide branch 73a or 73b, toward the recording media 76. In propagating in the divided branches of the waveguide, the outgoing light encounters a transition region 73d, FIGS. 8 and 10. As seen in FIG. 8a and particularly in FIG. 10, in this region, respective waveguide branches 73a1 and 73b1 are physically rotated in opposite directions about a longitudinal axis with respect to the waveguide branches 73a, 73b, respectively. The outgoing light propagating in these rotated waveguide branches, 73a1 and 73b1, now comprises both the TE and TM light modes. As seen in FIG. 10, each branch, 73a1 and 73b1, of the divided waveguide structure, contains a polarizer structure 73e and 73f which couples with light in the TM modes of 73a1 and 73b1 removing that light from the guides and allowing TE mode light to continue propagating in the guide. Each polarizer structure, 73e, 73f, is preferably formed of a thin metallic layer, such as aluminum, in close proximity to the waveguide structure.

After traveling through the polarizer/detector section 73d, the outgoing light is then guided into another transition region 73g wherein the angular orientation of the axis of each of waveguide branches 73a2, 73b2, is physically rotated back to the orientation of the waveguide branches 73a, 73b at the input. The outgoing light propagating in each of these waveguide sections 73a2, 73b2 has light in both the TE and TM modes.

Figure 8B:
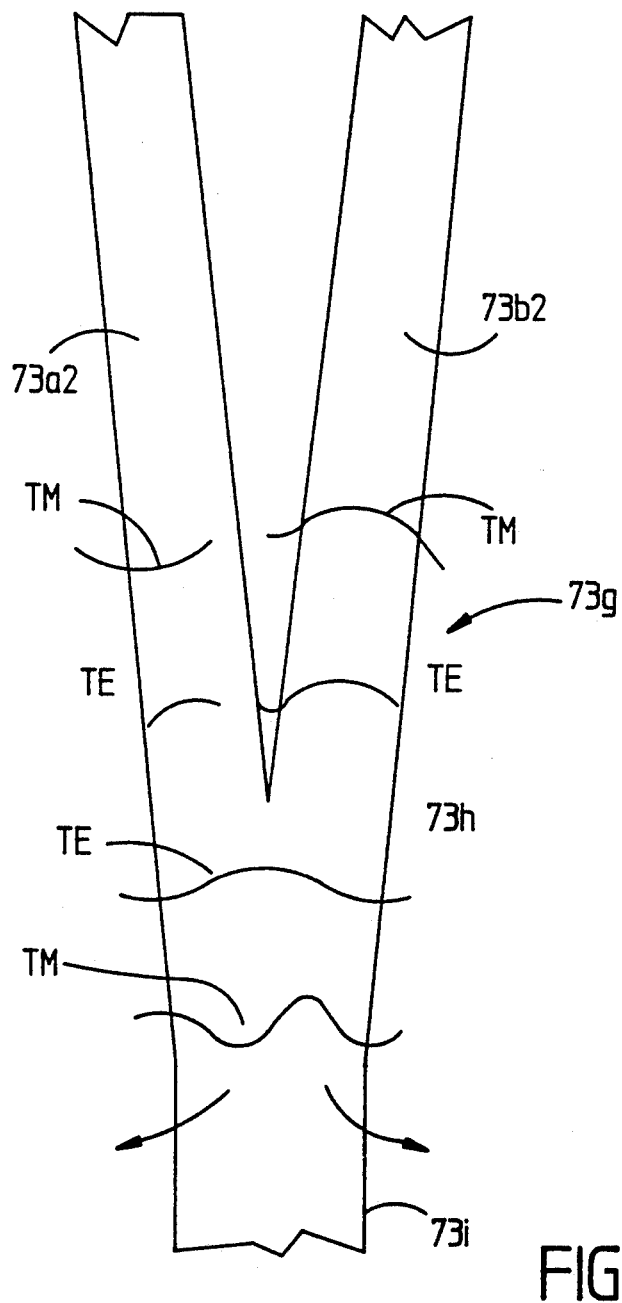
FIG. 8b is an enlarged view of a single mode splitting/combining junction.

The outgoing light propagating through the respective waveguide branches 73a2, 73b2 at the transition 73g undergoes identical but opposite rotations. As seen in FIG. 8b, TE and TM modes of outgoing light exist in both waveguide branches, 73a2, 73b2, the difference being that the phase of the outgoing light in the TM mode in one waveguide branch is a half cycle out of phase with the outgoing light in the TM mode in the other waveguide branch. The lengths of the divided waveguide branches are equal.

The outgoing light in the waveguide branches 73a2, 73b2 is combined at the single mode combining junction 73h of the waveguide 73. Since the outgoing TE light modes of the waveguide branches are in phase with one another, they sum to excite the lowest order outgoing TE light mode in the common or combined waveguide section 73i. This lowest order mode propagates on through the waveguide section 73i toward the recording media 76. But since the outgoing TM light mode in each waveguide branch 73a2, 73b2 is out of phase with that of the other, they excite the first odd TM mode of outgoing light in the common waveguide 73i. This first odd outgoing light mode is not supported by the tapering common waveguide 73i and is radiated out of the waveguide and thus no outgoing TM light mode propagates on toward the recording media 76. At the end of the waveguide section 73i, only the outgoing TE light mode is propagated therefrom to the magnetooptical recording media 76. As seen in FIG. 8b, the waveguide section 73i may be further tapered to reduce the cross track width of the light beam at the media.

The light reflected from the recording media 76 is coupled into the waveguide section 73i. This incoming light now has a small orthogonally polarized component due to Kerr rotation, the phase of which depends upon the polarization of the magnetic domain from that point at which the light is reflected. Incoming light in both the lowest order TE and TM light modes propagates in the waveguide and its branches back toward the laser 70d. In the lower transition region 73t, where the optical axes of the waveguide branches 73a1, 73b1, are physically rotated in opposite directions, the TM mode of the rotated waveguide is excited by both the TE and TM modes of the incoming light. When over a magnetic domain on the media, one of the waveguide branches 73a1, or 73b1, will have more of its TM light mode excited than the other, due to the component of the incoming TM mode adding to the component of the incoming TE mode in one and subtracting from the TE mode component in the other due to the different physical angular orientations of the respective principle axes of the waveguides and thus their TM mode orientation. At this point, the function of the metallic polarization layers 73e and 73f, is to let the incoming light in the TE mode pass and to couple with the incoming light in the TM mode. The incoming light in the TM mode is then detected by the respective photodiodes 73j and 73k. The photodiode detectors thus produce different photocurrents. These photocurrents are then differentially amplified or compared, as shown at comparator 79, FIG. 7, to yield the differentially detected magnetooptic data signal.

Figure 8C:
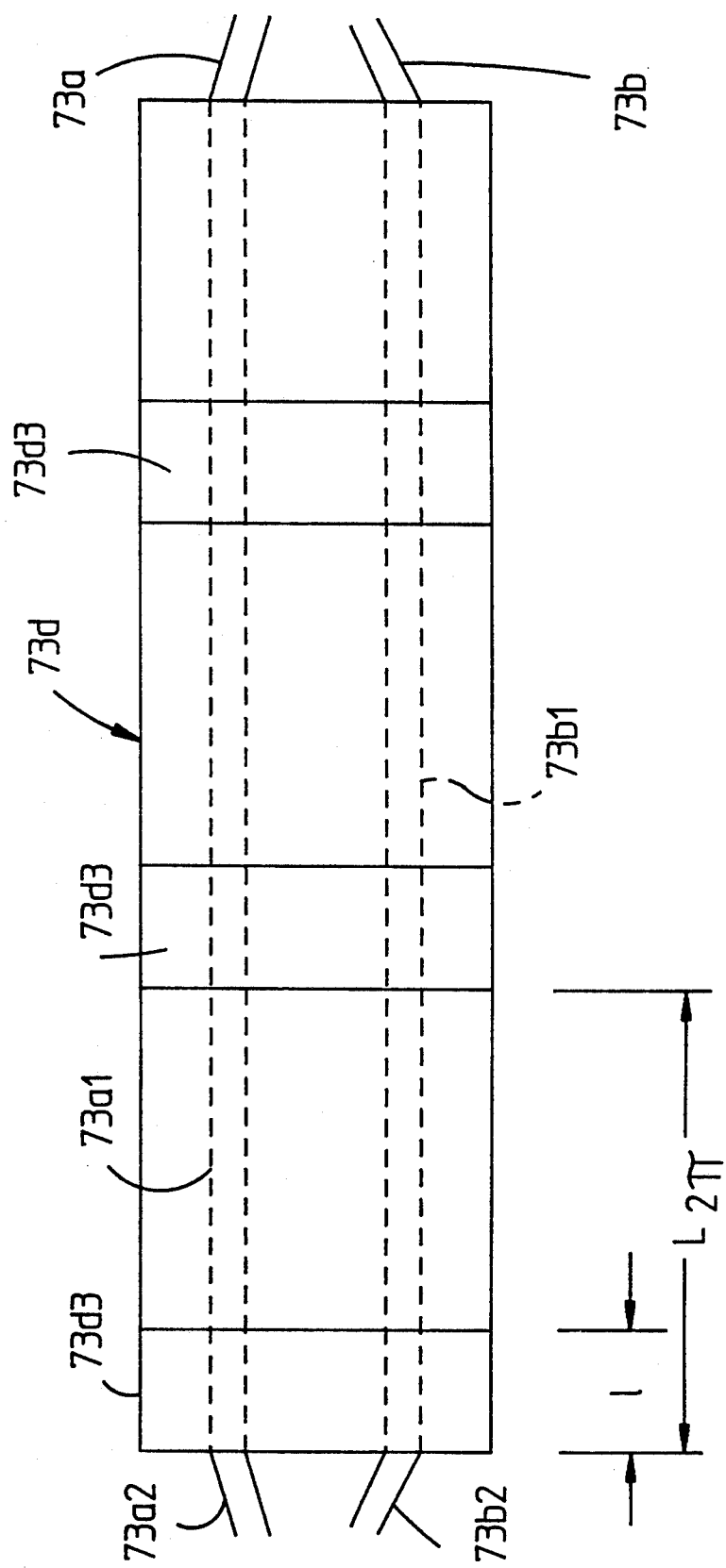
FIG. 8c illustrates the segmented structure of a polarizer/detector.

As the polarizer/detector structure 73e, 73f, are coupled to the light in the waveguide branches 73a1, 73a2, over some finite length, care must be exercised in the design of the length to maximize the differentially amplified signal. This is true since the $TE_{00}$ and $TM_{00}$ light modes have different propagation constants and thus their relative phase difference changes as they are guided through a length of waveguide. This means that the polarizer/detector structures 73e and 73f should be short compared to the "beat length" distance, i.e., distance required for the relative phase of the modes to change by $2\pi$. This is explained in FIG. 8c. Here the polarizer/detector 73d is schematically depicted as comprising a plurality of spaced polarizer detector sections 73d3. These sections are one beat length, $L_{2\pi}$, apart and their individual lengths, 1, along the waveguide 73a1 and 73b1 is short compared to the "beat length", $L_{2\pi}$. The detector structure, 73d, may be less than one beat length long or may comprise multiple beat lengths with plural segments, 73d3, as in FIG. 8c, which are short in length and phased with the other segments in the measuring system for signal detection.

The polarizer/detector is fabricated, in reference to FIG. 10, by etching a V groove in the slider body 71. The respective photodetectors are formed, for example, by depositing a layer of N- silicon on each face of the groove and a separate layer of P+silicon thereover on each groove face. Alternatively the V groove may be etched into a N-silicon substrate and then altered by diffusim in selected areas to form the p+regions. The substrate may later be bonded to the slider body. A cladding layer 73m is deposited over the P+silicon. The separate aluminum polarizer films 73e and 73f are next deposited followed by a layer of soda glass 73n. Next the channel waveguide 73, including the waveguide branches 73a1, 73b1, are formed by ion exchange. Thereafter the cover layer 73p is deposited and appropriate contact vias 73m1 are etched. Thereafter the contacts C engaging the P+layers of the photodetectors are formed. Techniques for fabricating such structures are well known.

Figure 11:
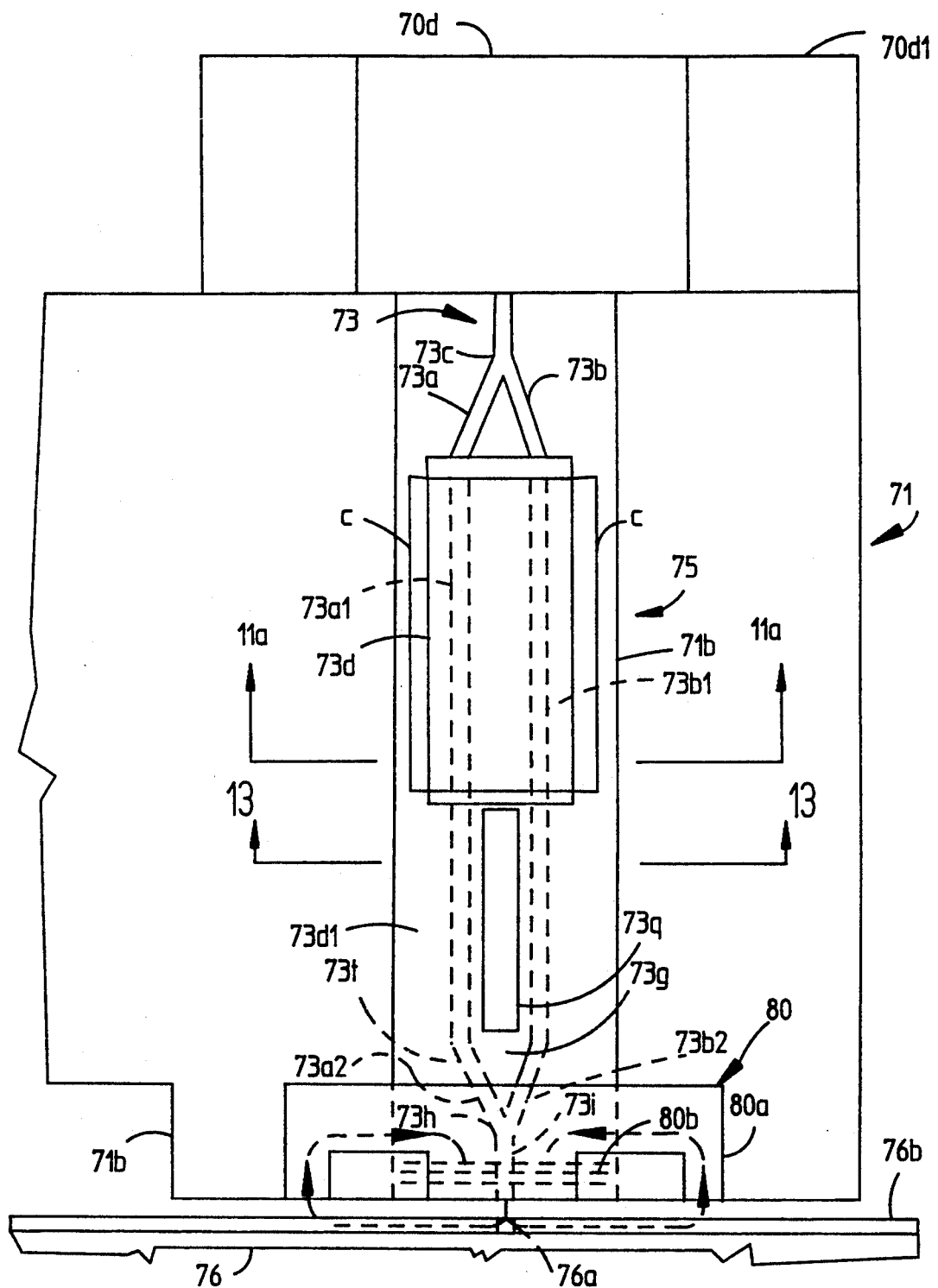
FIG. 11 is a plan view of another channel waveguide type of magnetooptic head, embodying the principles of this invention.
Figure 11A:
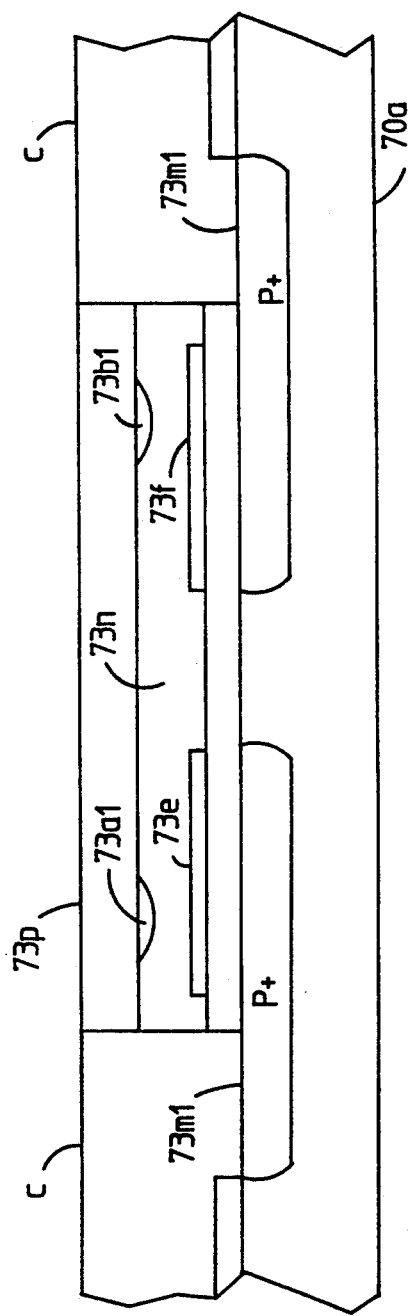
FIG. 11a is a cross sectional view taken on the line 11a—11a, of the polarizer detector section of FIG. 11.
Figure 12:
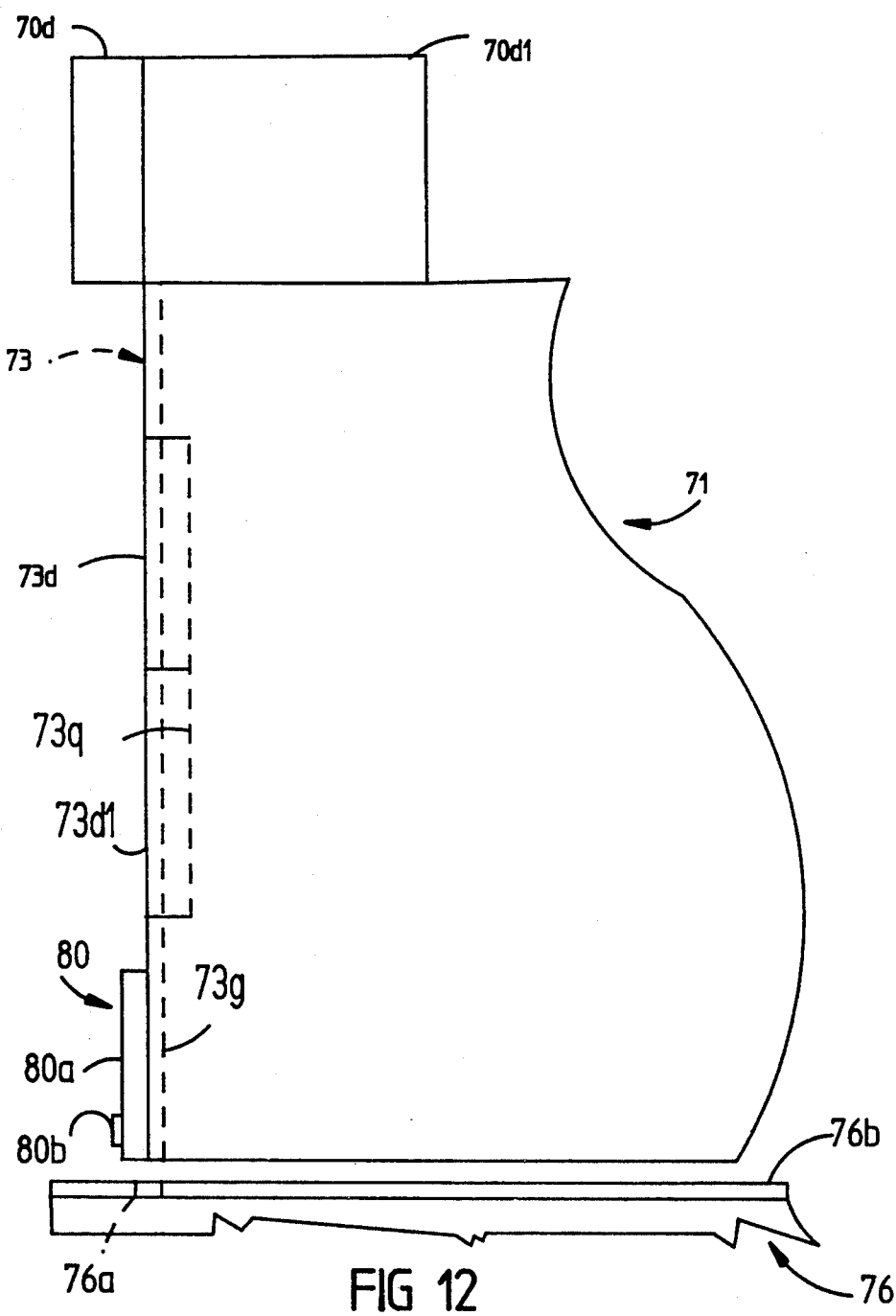
FIG. 12 is a side view of the magnetooptic head of FIG. 11.
Figure 13:
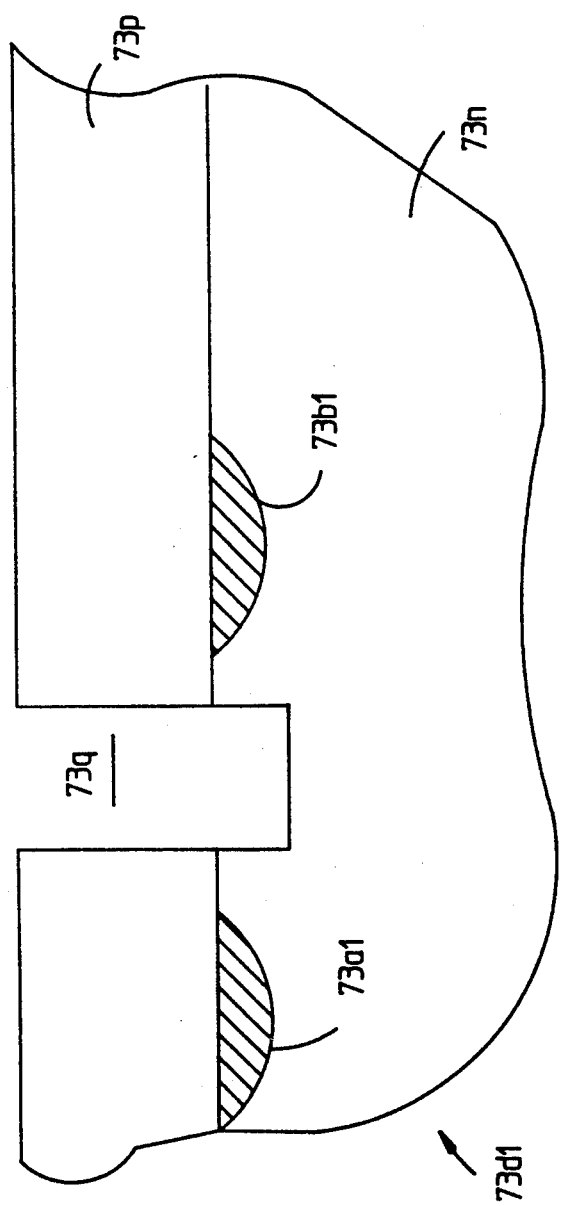
FIG. 13 is a cross-sectional view, taken on the line 13—13, of the optical light mode rotation section (the grooved section) of the channel waveguide structure of FIG. 11.

Another embodiment of this invention, also employing the divided channel waveguide structure of FIG. 8, is shown in FIGS. 11, 12 and 13. In this embodiment the principle axes of the light modes in the divided waveguide branches 73a, 73b, are optically rotated in a region 73d1, instead of physically rotating each waveguide about a longitudinal axis. This is achieved by locating a stress relief or stress inducing structure on one side or the other of a portion the waveguide branches 73a1, 73b1. A stress relief groove 73q, (see "Birefringence Control of High-Silica Single-Mode Optical Waveguide on Silica Substrates"; Kaname Jingujii et al, NTT Electrical Communications Laboratories) between the waveguide branches is shown in FIGS. 11 and 13. The asymmetric placement of this structure, or the groove, with respect to the waveguide branches, 73a1, 73b1 causes an asymmetric change in the stress across the adjacent waveguide and thus in the refractive index profile as well. The location of a single such structure or groove between the divided waveguide branches 73a1, 73b1, as seen in FIGS. 11 and 13, or two such structures or grooves, located one on the outside of each of the separate waveguide branches 73a, 73b, serves as an asymmetric location for each waveguide branch and thus oppositely rotates the light modes of one waveguide branch with respect to the light modes of the other waveguide branch. In this embodiment, the polarizer detector structures 73e, 73f, are constructed, not on the sloping surface of a V groove, as in FIG. 10, but on a surface in a plane parallel to the end of the slider 71, i.e., a plane parallel to the TE Mode electric field vibration of the laser diode, as shown in FIG. 11a. Thus light is coupled into the waveguide 73 from the laser diode 70d, is divided in region 73c into waveguide branches 73a, 73b, and is polarized by the polarizer/detector 73d. After propagating through the polarizer/detector 73d, the polarization of the outgoing light in each waveguide branch, 73a1, 73b1, is rotated in opposite senses about their respective longitudinal waveguide axes, such that both $TE_{00}$ and $TM_{00}$ modes are present upon entering the single mode power combining junction 73h. As in the embodiment of FIG. 8, only the outgoing $TE_{00}$ light mode is guided to the recording media 76.

Here again, the light reflected from a domain 76a, as incoming light into the waveguide section 73i, has a small TM component due to the Kerr rotation effect. The junction 73h now acts as a power splitter to incoming the light returning from the media, and light propagates in both waveguide branches 73a2 and 73b2. From these branches, the light travels through the optically asymmetric sections of the waveguide region 73d1. Here the axes of the waveguide branches are optically rotated, in opposite senses by the groove 73q, as distinguished from the opposite physical rotations of FIG. 8. Due to these opposite rotations, the polarizer/detector 73d in each waveguide branch, 73a1, 73b1, responds to the incoming light with a different photocurrent which when differentially amplified or compared by the comparator/amplifier 79 produce a signal indicative of the domain magnetization on the media, either up or down.

Figure 11B:
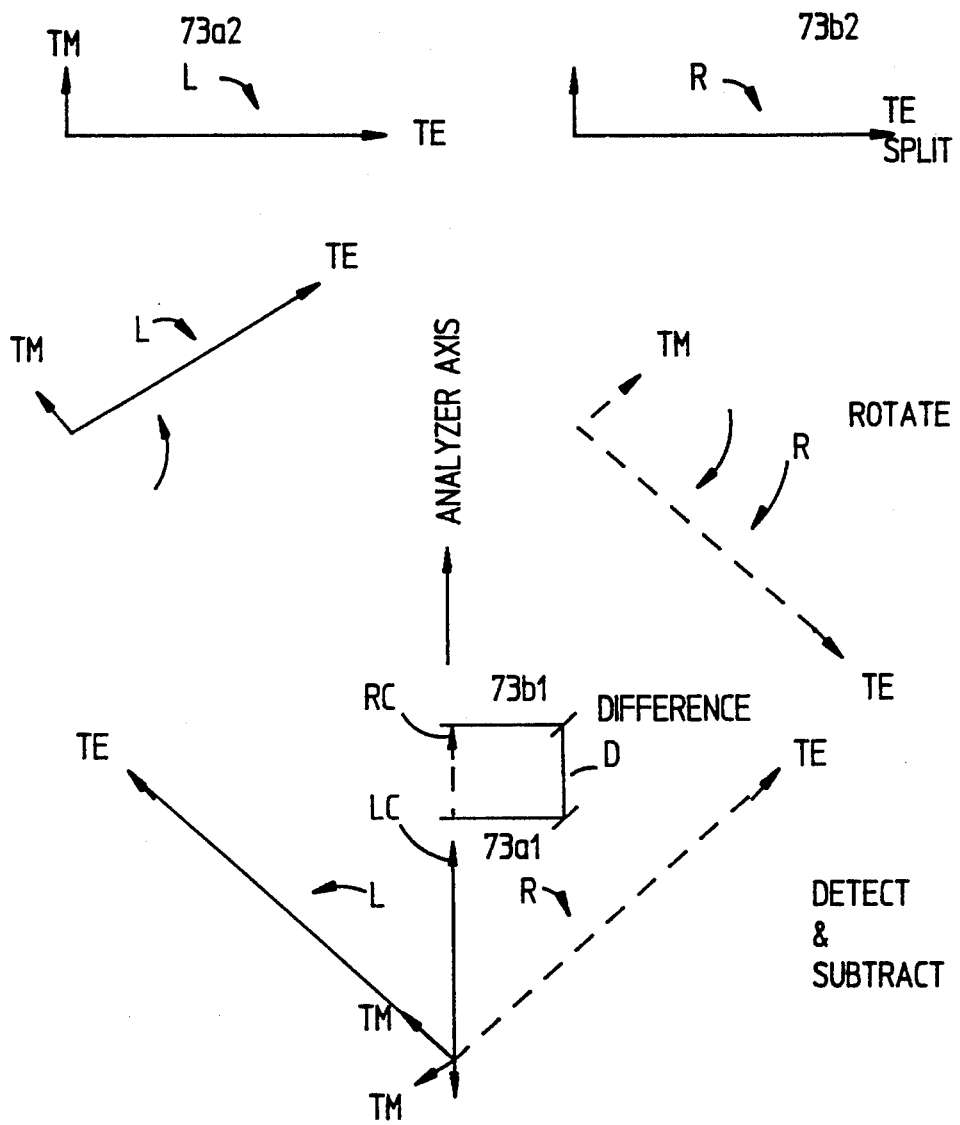
FIG. 11b is a vector diagram depicting polarization detection.

FIG. 11b is a vectorial illustration of polarization detection of the TM light mode of the incoming light. FIG. 11b, uses vectors to denote light components, L, R, of the incoming light. These vectors denote light polarization relationships, rotations, and detection principles in the different sections of the waveguide branches of the waveguide structure. These discussions apply to the embodiments of FIGS. 8 and 11. Reading this drawing from top to bottom, the light reflected from a domain at the media, is coupled into the waveguide structure 73 at the waveguide section 73i and is split into incoming light components L and R at the junction 73h. These incoming light components, L, R, propagate through the waveguide branches 73a2, 73b2, respectively, and are detected at the polarizer detector 73d in waveguide branches 73a1, 73b1.

The polarization orientation of the incoming light components, L, R, in the waveguide branches 73a2, 73b2, appears at the top of FIG. 11b in the section denoted "SPLIT". As the incoming light components, L, R, propagate in the waveguide branches 73a1, 73b1, the polarization states of the light components, L, R, in the respective branches are effectively rotated in opposite senses with respect to the polarizer/detector structures, TM mode vector direction, either by the physically rotated waveguide principal axes of FIG. 8 or by the optically rotated waveguide principal axes of FIG. 11. This polarization of the rotated incoming light is seen in the center of FIG. 11b in the section denoted "ROTATE".

The projection of the rotated polarization states of the light components, L, R, onto the polarizer/detector's TM mode vector direction, the vectorial combination, detection and subtraction of the light mode vectors is depicted at the bottom of FIG. 11a in the section denoted "DETECT AND SUBTRACT". Here the vectorial combination of the components LC and RC on the analyzer axis is depicted to produce a vector difference D which represents the difference and the sense of the difference between the RC and LC vector components, to indicate the state of magnetization, north pole up or north pole down of the magnetic domain.

Recording with the magnetooptic heads of both FIGS. 8 and 11 is accomplished by laser heating the media 76 at particular spots and substantially simultaneously coupling an electromagnetically produced magnetic field to the magnetic layer of the magnetooptic media 76 at the heated spot. An electromagnetic means 80 for producing and linking the magnetic field to the magnetooptic media 76, is seen in both FIGS. 8 and 11. The electromagnetic structure 80 comprises a magnetic circuit generally designated 80a. This magnetic circuit has three pole faces confronting the media 76 at the bottom side of the slider rail 71b, for example. Two pole faces, however, will suffice. A coil 80b is disposed about the center leg of this three pole magnetic circuit. The magnetic field which is produced upon energization of the coil 80b, links the magnetic layer 76b of the media 76, in a direction substantially perpendicular to the surface of the media. The magnetic field divides in the magnetic layer 76b and circulates back through the magnetic circuit 80a across the air gaps at the outer poles. By this expedient, a magnetic domain 76a, magnetized perpendicularly to the surface of the media 76 is recorded in the magnetic layer. The direction in which this magnetic domain is magnetized depends upon the direction of the current in the coil and thus the magnetic field at the center pole.

The magnetic circuit 80a, as seen in the side view of the slider assembly, FIGS. 9 or 12, is in very close proximity to, separated by a cladding layer, the bottom end of the waveguide 73. Thus when laser energy is coupled from the waveguide 73 into the magnetic layer 76b, to heat the layer at the point on the disk adjacent the end of the waveguide, the magnetic field of the electromagnet 80 linking the disk has its primary field strength concentrated at that heated spot. By concentrating the laser energy and heating a very small localized spot in the media above the curie temperature and locating the center magnetic pole in close proximity thereto to concentrate the magnetic field thereat, the strength of the magnetic field required to be generated by the magnetic circuit to record a magnetic domain at that heated location, is minimal. Domain recording is concentrated in the heated area. Stray fields beyond the area heated above the curie point are of insufficient strength to magnetize the magnetic layer 76b or to disturb or alter adjacent magnetic domains.

Reading, as described herein, represents an improvement over that described in the published EPO application 0 338 864 A2 which was discussed in the background of the invention. In that European application magnetic domain reading is done using waveguides of small Δn, the refractive index difference between the core and the cladding (or adjacent) materials. Examples are give of Δn values less than 0.01 using k+ion exchanged waveguides in soda glass or corning 0211 and a waveguide width of 5 μm with a diffusion depth of 2.5 μm. These types of waveguides are not suitable for resolving submicron domain sizes. Nor or they suitable for reading tracks of less than 4 μm in width. Writing of submicron domains can be done by modulating the magnetic field polarity rapidly, but reading of these domains requires a waveguide mode size on the order of the domain size. The Δn required between the waveguide and the cladding must be greater than 0.05 and the waveguide dimensions on the order of 2 microns in width and submicron in depth. For ion exchange guides in soda type glass, ions like Ag+ or Th+, instead of k+ as taught in the above patent application, are required to obtain a Δn of greater than 0.05 which is necessary to produce a mode size small enough to resolve submicron domain dimensions along the track. The other waveguide fabrication material system taught in the above referenced patent application, i.e., Ti diffused into LiTaO3, does not produce high Δn either. Further the teaching that the waveguide can simply be tapered to produce a narrower track is incorrect as tapering the guide below a certain width actually increases the mode size. (Reference: Kogelink "Limits in Integrated Optics" Proc. IEEE Vol. 69, Feb. 1981).

Although electromagnet coil structures of the type of conventional magnetic heads in magnetic types of disk drives, may be adapted for utilization in this application, by bonding to the face of the slider rail, at a location adjacent the bottom of the rail, in the position indicated in FIGS. 8 and 11, it is believed that the best mode for practicing this aspect of the invention is to utilize thin film deposition techniques for fabricating the electromagnet on the waveguide in any of the embodiments of this invention. In a thin film structure, the turns of the coil 80b on the backside of the magnetic circuit are first deposited on an insulating layer on the waveguide. Thereafter an insulating layer is deposited on the coil turns, leaving their ends exposed. Then the three pole magnetic circuit is deposited over the insulating layer, the center leg of the magnetic circuit leaving the ends of the coil turns exposed. Thereafter a layer of insulation is deposited upon the surface of the center leg of the magnetic circuit, whereafter the remaining turns of the coil are deposited over the insulating layer with the extremities of these last deposited coil turns being in metallic contact with the extremities of the turns of the coil previously deposited, to complete the coil circuit. The two ends of the coil 80b thus formed are disposed to be easily connected to conductors, forming part of the flexible circuit 82 shown in FIG. 4, to provide a circuit for connecting magnetizing current to the coil 80b.

FIGS. 14-18 illustrate still another embodiment of this invention, which may be described as a channel interferometer. Here also, the magnetooptic waveguide type of transducer is preferably fabricated on an end face of the slider 71 at the location of the slider rail 71b or a chip which is then bonded to the slider. This channel waveguide 73, which may also be fabricated by the ion exchange technique, comprises a first branch 73r which, for example, extends between the laser diode 70d and the bottom face of the slider rail 71b. At this location, the end of the channel waveguide 73r confronts the surface of the magnetooptic disk 76. An array of photodiodes 70h, located near, or on the top surface, of the slider 71, is coupled to the planar waveguide 73w which is coupled to channel waveguides 73s1 and 73u. Polarizing beam splitters 84 and 86 couple the channel waveguides 73s1 and 73s2 to the channel waveguide 73r. A corner mirror 85 couples the channel waveguide 73s2 to the channel waveguide 73u which in turn is coupled to the planar waveguide 73w. A corner mirror 88 couples the channel waveguide 73s1 to the planar waveguide 73w. The channel waveguide 73s1 provides a reference light beam in the TM mode to the planar waveguide 73w coupled to the photodiodes, and the channel waveguide 73s2 couples the signal light beam in the TM mode, which is the TM component of the Kerr rotated reflected light beam, the incoming light beam, from the magnetooptic media 76 to the channel waveguide 73u and to the photodiode array 70h. Thus the reference TM light mode and the signal TM light mode of the incoming light are compared in order to obtain a light image at the photodetector array indicative of the polarization of a magnetic domain in the magnetic media. The resulting electrical signals at the electrical output of the photodiode array, in the conductors 82a and 82b, are compared in a comparator circuit 79, FIG. 7, which may or may not be included in the slider 70 itself. The comparator output is indicative of the state of magnetization of the magnetic media at the point of light reflection.

Figure 14:
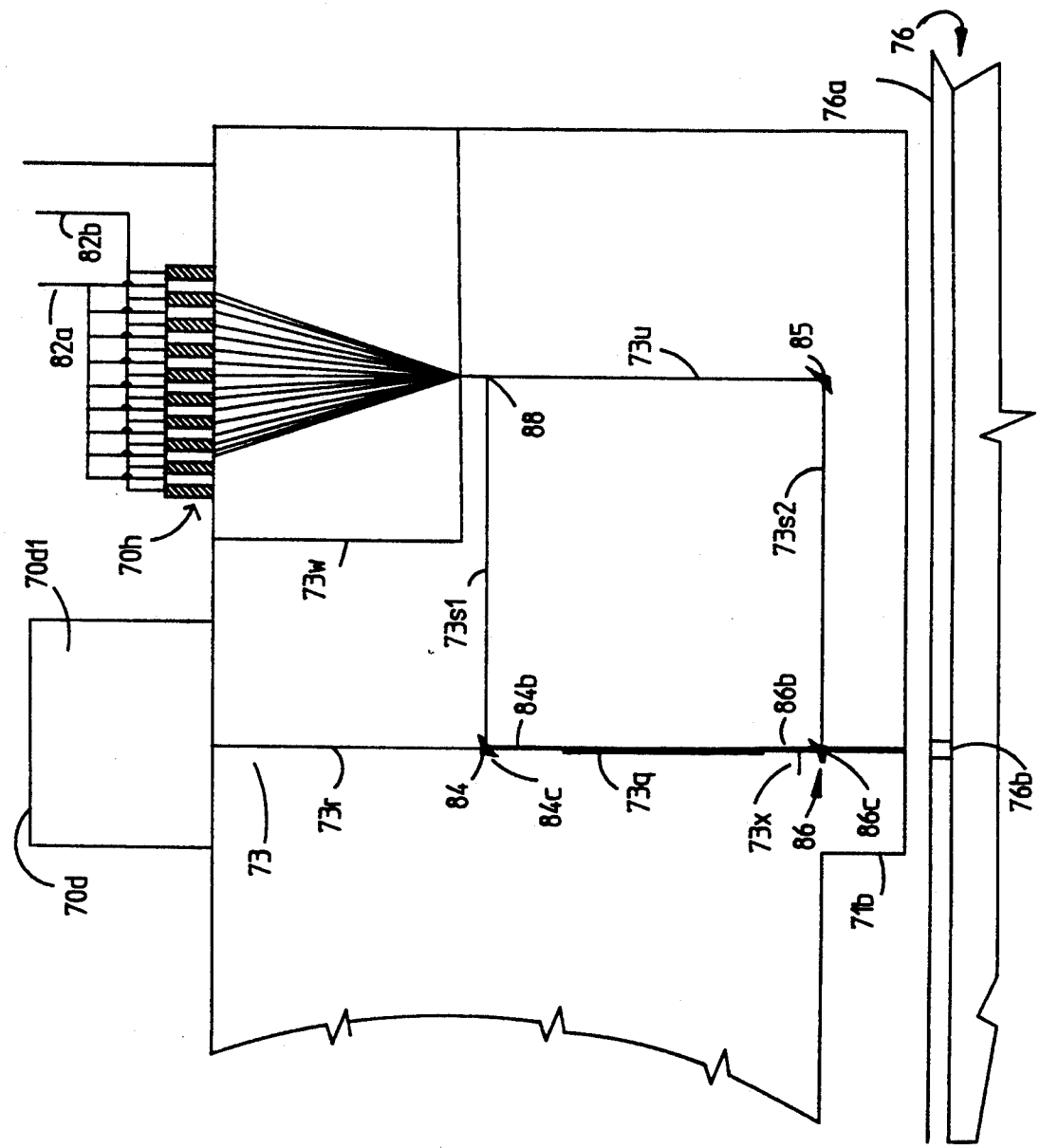
FIG. 14 is a plan view of a channel interferometer type of magnetooptic head embodying the principles of this invention.
Figure 15:
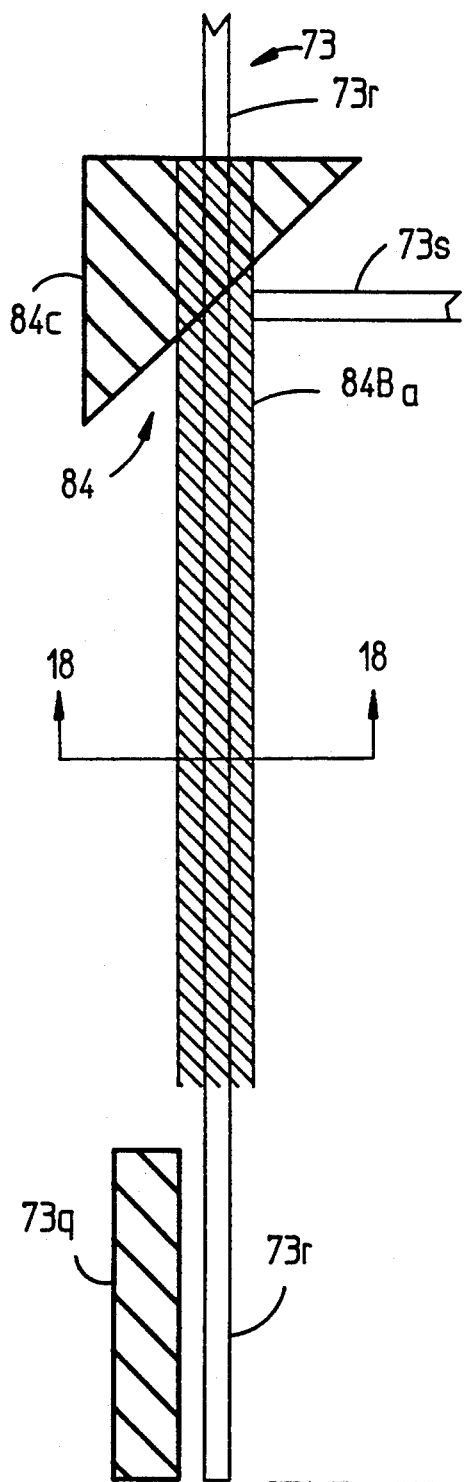
FIG. 15 is an enlarged plan view of the upper part of the channel waveguide structure of FIG. 14.
Figure 16:
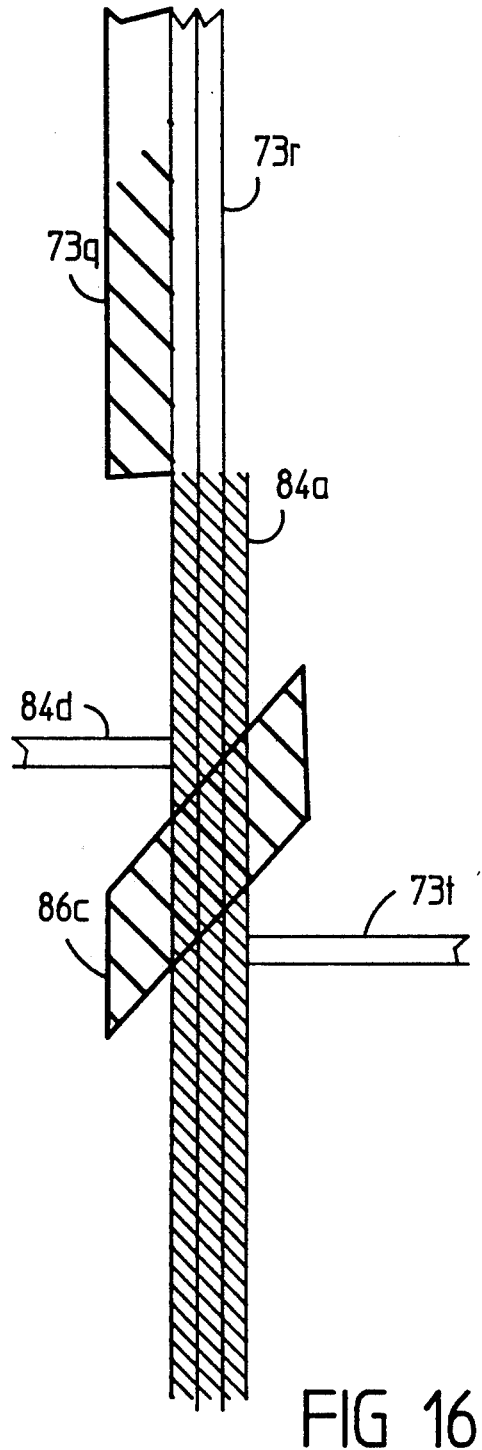
FIG. 16 is an enlarged plan view of the lower part of the channel waveguide structure of FIG. 14.
Figure 17:
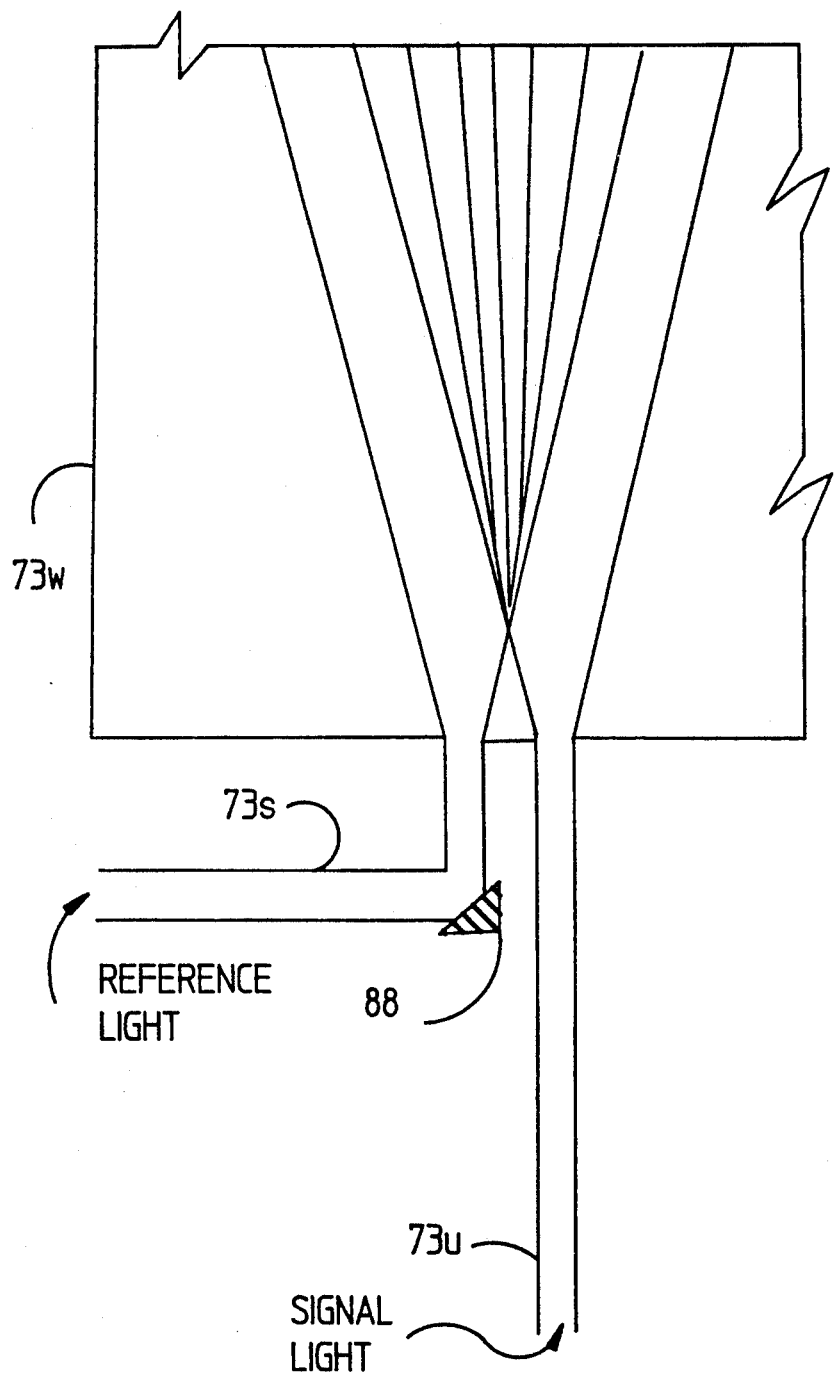
FIG. 17 is an enlarged plan view of the channel waveguide structures of FIG. 14 at the photo detectors.
Figure 18:
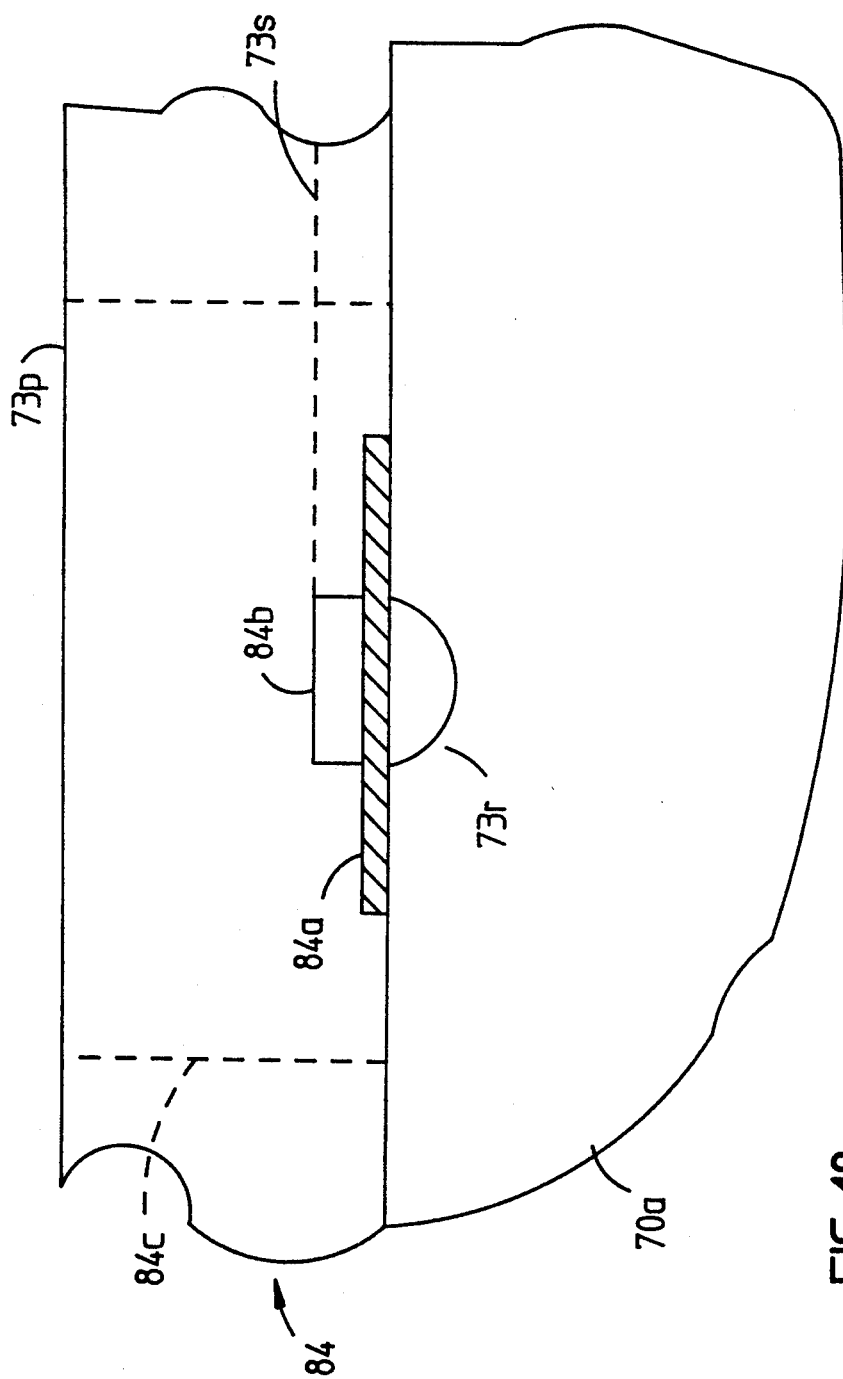
FIG. 18 is an enlarged cross-sectional view, taken on the line 18—18, of the polarizing beam splitter of the type of FIGS. 14 and 15.

Details of the implementation of the polarizing beam splitters are seen enlarged in the plan views of FIGS. 15 and 16 and in an enlarged cross-section in FIG. 18 taken on the line 18—18 of FIG. 15. The polarizing beam splitter 84 is used as an example. These polarizing beam splitters utilize thin metal films and the surface plasmon of TM light guided at their interfaces with a dielectric. See *Surface Plasmon Polaritons in Thin Metal Films*, by Johnstone et al in "Journal of Lightwave Technology, Vol. 8, No. 4, April 1990. A thin film aluminum interlayer, 84a, which effectively functions as a polarization selective coupler, overlays the channel waveguide branch 73r. A thin film channel waveguide 84b overlays the aluminum layer 84a in a position in line with the channel waveguide 73r. As seen in FIGS. 14, 15, 16, and 18, reflectors 84c (and 86c) in the respective beam splitters 84 and 86 overlay the aluminum polarizing film 84a and form the slanted end face of the thin film channel waveguide 84b and (86b) at the channel waveguide branches or intersections 73s1 and 73s2 respectively. These reflectors are seen in FIGS. 14, 15 and 16 and that for the beam splitter 84b is enlarged in FIG. 18 in which latter figure they are both represented by the dotted lines 84c in the cover layer 73p. As in the case of FIG. the principle axes of the light modes in the channel waveguide 73r are optically rotated by locating a stress relief or stress inducing structure 73q on one side of the waveguide. A stress inducing structure may be understood to function as an angled waveplate. A stress relief arrangement employed herein, involves a groove such as the groove 73q described in connection with FIG. 11. This physical asymmetry adjacent the channel waveguide 73r causes an asymmetric change in the stress across the adjacent waveguide 73r and thus in the refractive index profile as well. The outgoing light in the channel waveguide 73r after the region of the groove 73q propagates in the TE and TM light modes and the TM light mode is coupled to the thin film aluminum layer 84a and then is coupled upwards into waveguide 84b where it is reflected by 86c into channel waveguide 84d which may be coupled to a photodiode (not shown) for monitoring the laser output power. Thus the TE light mode in waveguide 73r is passed onto the media. Light returning from the media 76 in the TM mode is split off from the main channel waveguide 73r by the polarizing beam splitter 86 and propagates in the channel 73s2, is reflected by the corner mirror 85 into the channel 73u and into the planar waveguide 73w. Light returning in the TE mode passes polarizing beam splitter 86, is rotated by the waveplate or the stress inducing structure 73q such that it consists of both TE and TM modes. The TM mode component is split off into the waveguide 73s1 by polarizing beam splitter 84, is reflected into planar waveguide 73w by reflector 88 and is employed as the reference light beam for interference with light reflected from the media (signal light) in the TM mode as shown in FIG. 17. Thereafter, signal and reference light in the TM light mode is coupled from the planar waveguide 73w into the photodetector array 70h. The interference pattern formed by the two diverging interfering lights in 73w consists of light and dark bands or fringes due to the path difference which accumulates between the light from each waveguide, 73s and 73u, as it diverges in the planar waveguide section 73w. This bright then dark alternating fringe pattern changes to a dark then bright fringe pattern when the media domain, 76b, at the end of the waveguide 73r changes from magnetization up to magnetization down. Thus the current generated by the set of photodetector array elements, connected by conductor 82a, increases or decreases (while the current in 82b does the opposite) depending on whether its set of photodetectors is coupled to the bright or dark parts of the fringe pattern. The spacing of the photodetector elements must be such as to sample the fringe pattern at the appropriate positions such that one set of array elements always samples generally in the bright region of the interference pattern and the other set always samples in the dark regions for one particular media domain magnetization. In this way each set of array element generates current proportional to the bright regions while the other set generates current proportional to the dark regions of the fringe pattern. The electrical signals on the conductors 82a and 82b, when compared indicate the state of magnetization of the spot on the media at which the light was reflected. Thus, the difference of these signals, indicating the state of polarization, is useful in determining the data which is represented by the magnetization states of successive magnetic domains along a track.

The channel interferometer type of read/write head of FIG. 14 provides a common optical path between the head and the media for both the signal and reference optical beams and thus the relative phase difference is insensitive to changes in flying height. Because of the sheared wave fronts of the diverging light beams in the planar waveguide region 73w, differential detection can be employed. The polarizing beam splitters are easily and simply fabricated, using conventional techniques. Submicron lithography is not required. Fabrication tolerances which cause optical imbalances are easily compensated at the detector array by adjusting the detector position along the fringe pattern produced by the interfering beams. The optical function in transducing or sensing magnetic domains has low sensitivity to wavelength shifts, since the interfering light is TM in all waveguide sections except for one.

As taught herein, existing optical waveguide technology, coupled with the air bearing slider technology, of magnetic disk drives, provides the basis for the fabrication of these unique magnetooptic read/write heads which are conventionally supported to fly over the surface of a disk. Using near-field optic technology, these magnetooptic heads eliminate the need for adjustable focusing of the light beam on the disk surface. This fabrication approach offers a means for extending the disk drives' volumetric storage capacity, by increasing the head/media contribution while allowing higher flying heights, say starting at up to 16 or 20 micro inches of flying height, than magnetic heads.

The most promising flying waveguide head structure of those disclosed herein, presently regarded as the best mode for practicing the invention, is the channel interferometer head. This head structure is seen in FIG. 14. With this head structure, assuming a maximum index difference of about 0.5 between the waveguide core and cladding, about 190 kilo bits per inch are achievable.

Realizable bits per inch are 1.5× to 3× those possible with far-field optical devices using "free space" optics, that is, optical structures using separate components, lenses and so forth. The improvement achieved with this invention is due to the "near-field" nature of the integrated optical flying head structure which offers a smaller in track domain size than the "free-space" optics structure, since it is not limited by Fraunhofer (far-field) diffraction. In the far-field structures, bit densities are diffraction limited. In both the far-field and near-field structures, spot sizes scale with wavelength.

In the integrated magnetooptical flying head structures described herein, track density is tailorable between a lower track density of about 2300 tracks per inch to an upper track density at about 100,000 tracks per inch. This upper limit assumes an index difference of 0.5 and a track center line spacing of 1½ domain widths. The lower limitations on the track density stems from laser power and birefringence considerations. The conceivable upper limit on areal densities based solely on spot size is over 19 Gigabits per square inch.

Important contributions of the waveguide type of magnetooptic head structures of this invention are higher areal density than conventional magnetic heads or optical heads with lenses only, increased numbers of bits per inch, adjustable tracks per inch through a tailorable domain aspect ratio, allowing easier transitions into Winchester types of drives, and the use of existing magnetooptic thin film media. This coupled with integrated circuit types of magnetooptic head structures using head supports, flying heads and actuator drive techniques of conventional magnetic disk drives, affords improvements in magnetooptic types of disk drive systems not heretofore obtainable. The improvements in reading and writing, as taught hereinabove, are accomplished primarily by employing unique integrated optic head structures capable of working in the "near-field" of an optical waveguide. Using the near-field/waveguide technology allows higher bit per inch recording densities than far-field types of optical structures are capable of providing, the reason being that confined waveguide mode sizes are smaller than the far field optical spot sizes formed by lenses which are limited by diffraction.

The various embodiments of this invention illustrate magnetooptic heads in which the waveguide of the head is built into the end of a glass slider of the same size and mass used in high performance magnetic Winchester types of disk drives. The process for integrating the waveguide into the glass slider uses integrated circuit planar processing technology. An electronic to optical transducer such as a laser diode is conveniently fabricated, as a part of the slider, or as a separate part bonded to the slider, to provide optical input to one end of the waveguide, at its upper end, as seen in the drawings. An optical to electronic transducer, involving a photo detector assembly, provides the read out of this magnetooptic integrated circuit type of head.

The electromagnetic structure involving a magnetic circuit and a coil linking the magnetic circuit which is integrated at the lower end of the waveguide defines an air gap between the end of the magnetic circuit and the media which is perpendicular (not parallel) to the surface of the media. This magnetic circuit as distinguished from prior art magnetic circuits, discussed hereinabove, provides domain recording in the magnetic layer on the media in which the domains are polarized in a direction perpendicular to the surface of the media. The laser current is driven DC to heat a spot on the media above its Curie temperature. Modulation of the coil current to "write" the magnetic domain when the media spot is above Curie temperature allows direct over writing of existing information. This integrated circuit magnetooptic head is thus applicable to overwrite using existing media, wherein the magnetic field is modulated and the laser is driven DC, or, with media currently in development and testing wherein multiple layers of thin films are required and the laser power is modulated.

All embodiments of this invention are implemented using current integrated circuit technology in forming the various planar and channel waveguides and thin film layers employed in fabricating this magnetooptical waveguide type of transducer. Etching techniques required in forming grooves, such as the groove 73q for achieving optical asymmetry with respect to the waveguides, for rotating the optical axis of the light propagating in the waveguide, or, for forming grooves having sloping sides for physically rotating sections of the waveguide, again to achieve physical rotation of the optical axis of the light propagating therethrough, are well known. Sequences, as stated above, for performing the various operations of ion exchange, etching and thin film deposition for fabricating planar or channel waveguides, photodetectors, polarizers, beam splitters, etc., are evident from an inspection of the structures represented in the several figures of the drawings.

The different embodiments of this invention are all pointed at providing a light weight magnetooptic transducer having the flying characteristics of a conventional magnetic head type of transducer and to be used and controlled in essentially the same manner, whether by linear or rotary actuators and servos therefor.

By providing a magnetooptic type of transducer which may be flown on a thin film of air clinging to the disk in a disk drive and operated in the "near-field" optical range, the need for a focusing servo in controlling head spacing with respect to the media is eliminated.

The head structure, in using integrated circuit technology and eliminating the need for separate lenses, and other parts of the head relating to the support and positioning of such lenses, significantly reduces the weight and the size of the head and allows multiple disk platters to be stacked in a disk drive using this type of head thereby allowing the high areal densities of optical recording to manifest in high volumetric storage densities.

What is claimed is:

1. A magnetooptic read/write head for magnetically recording on a magnetooptic media or for reading magnetic recordings thereon, comprising:

a slider body having a surface adapted to be disposed adjacent the surface of said magnetooptic media;

a waveguide structure on said slider, said waveguide structure having opposite ends, one of said opposite ends of said waveguide structure being disposed adjacent said surface of said slider;

a light source on said slider coupled to said waveguide structure adjacent the other of said opposite ends of said waveguide structure;

detector means having light sensitive means coupled to said waveguide structure for sensing light in said waveguide structure;

a magnetic circuit, having at least two poles, each pole having an end, said magnetic circuit being disposed on said slider with the end of one pole overlying said one of said opposite ends of said waveguide structure, the other of said two poles being disposed on said slider removed from said one pole and said one of said opposite ends of said waveguide structure and having the end of said other of said two poles adjacent said first surface of said slider, the ends of said poles adapted to confront and form airgaps with the surface of said magnetooptic media; and coil means electromagnetically coupled to said magnetic circuit for producing a magnetic field adapted to link said magnetooptic media across said airgaps.

2. The magnetooptic read/write head of claim 1, in which:

said coil means comprises a coil disposed about said one pole of said magnetic circuit.

3. The magnetooptic read/write head of claim 1, in which:

said slider is a glass slider and said waveguide structure is an integral part of said slider.

4. The magnetooptic read/write head of claim 1, in which:

said magnetic circuit and said coil are thin films disposed on said waveguide structure at said one of said opposite ends of said waveguide structure.

5. The magnetooptic read/write head of claim 1, in which:

said waveguide structure is a planar waveguide and further comprises;

a collimating lens integral to said planar waveguide at said other of said opposite ends of waveguide structure, and an objective lens integral to said one of said opposite ends of said waveguide structure.

6. The magnetooptic read/write head of claim 5, in which:

said objective lens focuses light transmitted from said planar waveguide at said objective lens and collimates light entering said planar waveguide at said objective lens.

7. The magnetooptic read/write head of claim 5, in which:

said light sensitive means on said slider comprises optical prism means on said planar waveguide between said collimating lens and said objective lens.

8. The magnetooptic read/write head of claim 7, in which:

said optical prism means comprises first and second prisms respectively disposed in opposite lateral portions of the collimated light in said planar waveguide, each prism having an optical axis disposed to pass light in corresponding light modes in said respective opposite lateral portions of said collimated light.

9. The magnetooptic read/write head of claim 1, in which:

said waveguide structure comprises a channel waveguide structure having first and second channel waveguides intermediate said opposite ends and integral with said opposite ends, and said light sensitive means comprises a pair of photodetectors, respectively coupled to said first and second channel waveguides.

10. The magnetooptic read/write head of claim 9, further comprising:

means for rotating the plane of polarization of light in said first and second channel waveguides respectively, in opposite directions, and said light sensitive means comprises a photodetector in each channel, each for sensing the same light mode.

11. The magnetooptic read/write head of claim 10, in which:

said means for rotating the plane of polarization of light in said first and second channel waveguides comprises physically angularly displacing a portion of each first and second channel waveguide about a longitudinal waveguide axis.

12. The magnetooptic read/write head of claim 10, in which:
said means for rotating the plane of polarization of light in said first and second channel waveguides comprises stress means providing an asymmetric physical discontinuity adjacent each of said first and second channel waveguides.

13. The magnetooptic head of claim 1, in which:
said waveguide structure comprises a main channel waveguide between said opposite ends;
first and second beam splitters in longitudinally spaced positions in said main channel waveguide;
rotating means for rotating the plane of polarization of light located between said first and second beam splitters;
a reference channel waveguide and a signal channel waveguide optically coupled to said first and said second beam splitters, respectively;
photodetector means; and
planar waveguide means optically differentially connecting said reference channel waveguide and said signal channel waveguide to said photodetector means.

14. A magnetooptic read head for transmitting light to a magnetooptic media and for receiving reflected light reflected from said media, comprising:
a planar waveguide, having an input end and an output end;
a light source coupled to said input end of said planar waveguide;
a planar collimating lens in said waveguide at said input end for collimating light from said light source transmitted in said planar waveguide;
a planar objective lens in said output end of said planar waveguide for focusing light transmitted from said waveguide to said media and for collimating reflected light from said media entering said planar waveguide at said objective lens; and
detector means comprising at least two optical to electrical transducers, respectively optically coupled to said waveguide for exposure to opposite lateral portions of collimated light between said lenses for producing respective electrical signals in response to the polarization states of respective corresponding portions of reflected light in said opposite lateral portions of said collimated light.

15. A magnetooptic read head according to claim 14, in which:
each optical to electrical transducer comprises an optically birefringent prism having its optic axis oriented in a direction corresponding to the plane of polarization of the reflected light coupled thereto, and;
a photoconductor optically coupled to each optically birefringent prism for producing an electrical output in response to light coupled thereto by said prism.

16. A magnetooptic read head according to claim 14, in which:
each optical to electrical transducer comprises an optically birefringent prism having its optic axis oriented substantially perpendicular to the plane of polarization of the reflected light, coupled thereto, and;
a photoconductor optically coupled to each optically birefringent prism for producing an electrical output in response to light coupled thereto by said prism.

17. A magnetooptic read head for transmitting light to a moving magnetooptic media and for receiving reflected light reflected from said media, comprising:
a support;
a planar waveguide, having an input end and an output end, mounted on said support;
a light source coupled to said input end of said planar waveguide;
a planar collimating lens in said waveguide at said input end for collimating light from said light source transmitted in said planar waveguide;
a planar objective lens in said output end of said planar waveguide for focusing light transmitted from said waveguide to said media and for collimating reflected light from said media entering said planar waveguide at said objective lens; and
detector means comprising at least two optical to electrical transducers, respectively optically coupled to said waveguide for exposure to opposite lateral portions of collimated light between said lenses for producing respective electrical signals in response to the polarization states of respective corresponding portions of reflected light in said opposite lateral portions of said collimated light.

18. A magnetooptic read head according to claim 17, in which:
each optical to electrical transducer comprises an optically birefringent prism having an optic axis oriented in a direction corresponding to the plane of polarization of the reflected light coupled thereto, and
a photodetector optically coupled to each optical prism for producing an electrical output in response to light coupled thereto by said optical prism.

19. A magnetooptic read head according to claim 17, in which:
each optical to electrical transducer comprises an optically birefringent prism having an optic axis oriented substantially perpendicular to the plane of polarization of the reflected light coupled thereto, and
a photodetector optically coupled to each optically birefringent prism for producing an electrical output in response to light coupled thereto by said prism.

20. A magnetooptic read head according to claim 17, in which:
said magnetooptic media is a rotatable disk in a disk drive, and said support is a slider for flying on the air bearing at the surface of said disk as said disk rotates.

* * * * *